(12) United States Patent
Flann et al.

(10) Patent No.: US 7,228,214 B2
(45) Date of Patent: Jun. 5, 2007

(54) PATH PLANNER AND METHOD FOR PLANNING A PATH PLAN HAVING A SPIRAL COMPONENT

(75) Inventors: Nicholas Simon Flann, Smithfield, UT (US); Shane Lynn Hansen, Smithfield, UT (US); Sarah Ann Gray, Providence, UT (US)

(73) Assignee: Deere & Company, Moline, IL (US)

( * ) Notice: Subject to any disclaimer, the term of this patent is extended or adjusted under 35 U.S.C. 154(b) by 135 days.

(21) Appl. No.: 11/042,561

(22) Filed: Jan. 25, 2005

(65) Prior Publication Data

US 2005/0197757 A1  Sep. 8, 2005

Related U.S. Application Data

(63) Continuation-in-part of application No. 10/446,345, filed on May 28, 2003, now Pat. No. 6,934,615, which is a continuation-in-part of application No. 10/403,681, filed on Mar. 31, 2003, now Pat. No. 7,010,425.

(51) Int. Cl.
*G01C 22/00* (2006.01)
*G05D 1/00* (2006.01)

(52) U.S. Cl. ............... 701/50; 180/168; 56/10.1
(58) Field of Classification Search ............ 701/50, 701/41, 23, 26, 207, 122, 200, 214, 224; 180/168; 172/3, 5, 26; 56/10.2 F, 10.1, 56/10.2 D, 10.2 H
See application file for complete search history.

(56) References Cited

U.S. PATENT DOCUMENTS 4,398,195 A * 8/1983 Dano .................... 342/46
4,967,362 A * 10/1990 Schutten et al. ............ 701/50
5,486,822 A    1/1996 Tenmoku et al. ...... 340/995.22
5,528,888 A    6/1996 Miyamoto et al. .......... 56/10.2
5,648,901 A    7/1997 Gudat et al. .......... 364/424.027
5,684,476 A   11/1997 Anderson ................ 340/988
5,751,576 A    5/1998 Monson .................... 700/83
5,870,564 A    2/1999 Jensen et al. ............. 709/241

(Continued)

FOREIGN PATENT DOCUMENTS

CA    2316774    11/2001

(Continued)

OTHER PUBLICATIONS

Gray, Sarah A., Planning and Replanning Events for Autonomous Orchard Tractors [online], 2001 [retrieved on Mar. 17, 2003]. Retrieved from the Internet:<URL: http://www.autonomoussolutions.com/press.html>.

(Continued)

*Primary Examiner*—Dalena Tran

(57) ABSTRACT

A method and path planner for planning a path of a vehicle comprising a perimeter training module for identifying a border of a region associated with a work area. A definer for defining a reference row having a reference path that tracks at least a majority of the border. A generator generates tracking rows that track the reference row. The tracking rows comprise at least one inner tracking row and an outer tracking row. Each inner tracking row having at least one inner curve with a lesser radius than an outer tracking row having a corresponding outer curve with a greater radius.

31 Claims, 16 Drawing Sheets

U.S. PATENT DOCUMENTS

| | | | | |
|---|---|---|---|---|
| 5,955,973 | A | | 9/1999 | Anderson .................. 340/988 |
| 5,963,948 | A | | 10/1999 | Shilcrat ...................... 707/100 |
| 5,974,347 | A | | 10/1999 | Nelson ......................... 701/22 |
| 5,978,723 | A | | 11/1999 | Hale et al. .................... 701/50 |
| 5,987,383 | A | * | 11/1999 | Keller et al. ................ 701/213 |
| 5,995,902 | A | | 11/1999 | Monson ...................... 701/202 |
| 6,085,130 | A | | 7/2000 | Brandt et al. ................. 701/26 |
| 6,088,644 | A | | 7/2000 | Brandt et al. ................. 701/50 |
| 6,128,574 | A | | 10/2000 | Diekhans .................... 701/209 |
| 6,131,069 | A | * | 10/2000 | Bottinger ....................... 702/5 |
| 6,141,614 | A | | 10/2000 | Janzen et al. ................. 701/50 |
| 6,205,381 | B1 | | 3/2001 | Motz et al. .................... 701/25 |
| 6,236,924 | B1 | | 5/2001 | Motz et al. .................... 701/50 |
| 6,240,342 | B1 | | 5/2001 | Fiegert et al. ................ 701/25 |
| 6,263,277 | B1 | | 7/2001 | Tanimoto et al. ........... 701/209 |
| 6,336,051 | B1 | | 1/2002 | Pangels et al. ............... 700/50 |
| 6,385,515 | B1 | | 5/2002 | Dickson et al. ............... 701/28 |
| 6,445,983 | B1 | | 9/2002 | Dickson et al. ............... 701/23 |
| 6,703,973 | B1 | * | 3/2004 | Nichols ................. 342/357.17 |
| 6,876,920 | B1 | * | 4/2005 | Mailer ......................... 701/207 |
| 2002/0040300 | A1 | | 4/2002 | Ell ................................. 705/1 |
| 2004/0068352 | A1 | | 4/2004 | Anderson .................... 701/25 |

FOREIGN PATENT DOCUMENTS

| | | |
|---|---|---|
| DE | 100 25 829 A1 | 12/2001 |

OTHER PUBLICATIONS

Gunderson, R. W., Torrie, M. W., Flann, N. S., Neale, C. M. U., Baker, D. J., GIS and the Computer-Controlled Farm [online], Jul. 2000. Retrieved from the Internet <URL: http://www.autonomous-solutions.com/press.html>.

Gray, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet <URL: http://www.autonomoussolutions.com/press.html.

Gray, Sarah, What is Path Planning [online], Aug. 17, 2002 [retrieved on Mar. 17, 2003]. Retrieved from the Internet <URL: http://www.autonomoussolutions.com/press.html.

"Computer Generation of Efficient Farm Field Courses", a thesis submitted to the Faculty of Graduate Studies and Research In Partial Fulfillment of the requirements for the degree of Electrical Engineering, Faculty of Engineering, University of Regina, By Gin Liu.

Kunnayut Eiamso-ard & Howie Choset, Entitled: Sensor Based Path Planning: Three-Dimensional Exploration And Coverage; Department of Mechanical Engineering Carnegie Mellon University Apr. 16, 1999.

Ruggero Frezza, Giorgio Picci, & Stefano Soatto, Entitled: A Lagrangian Formulation of Nonholonomic Path Following.

F. Glover, Tabu Search Part 1; ORSA Journal on Computing vol. 1 No. 3, pp. 190-206, 1989.

F. Glover, Tabu Search Part 2; ORSA Journal on Computing vol. 2 No. 1, pp. 4-32, 1990.

* cited by examiner

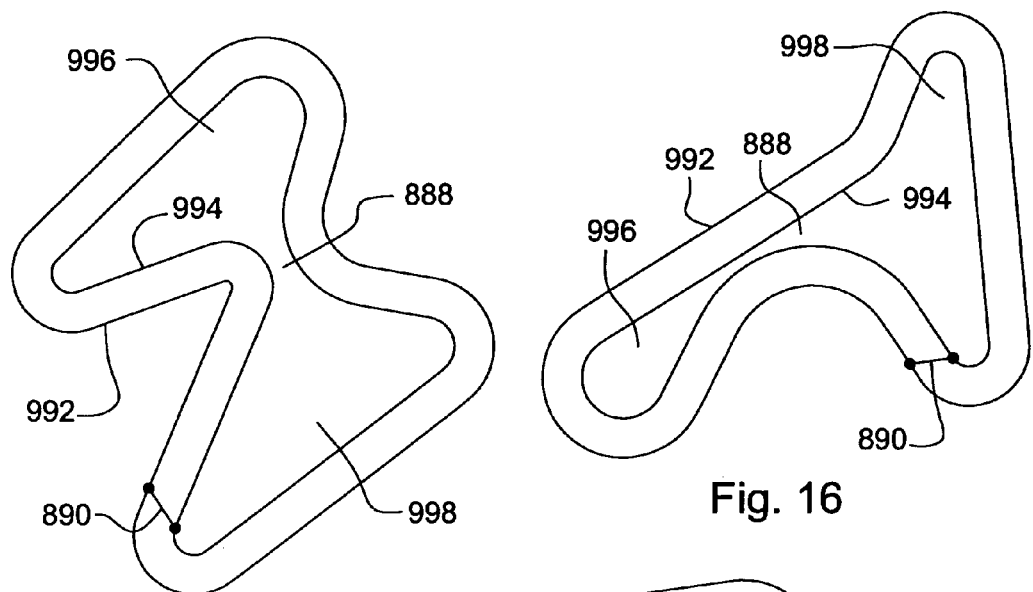
Fig. 15
Fig. 16
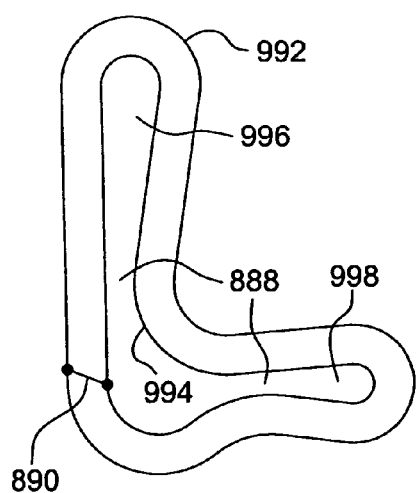
Fig. 17
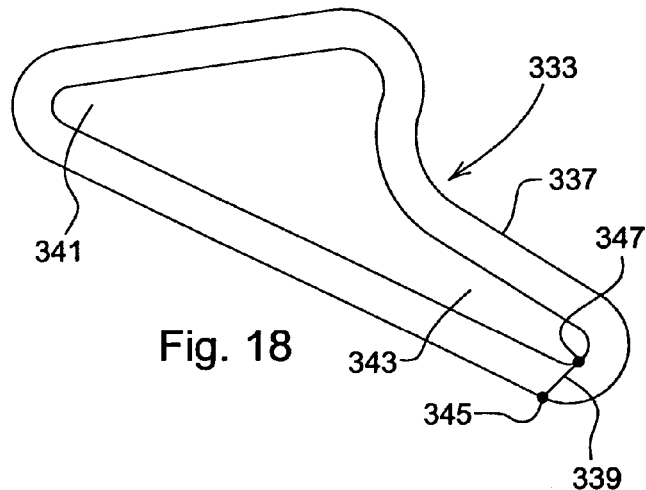
Fig. 18
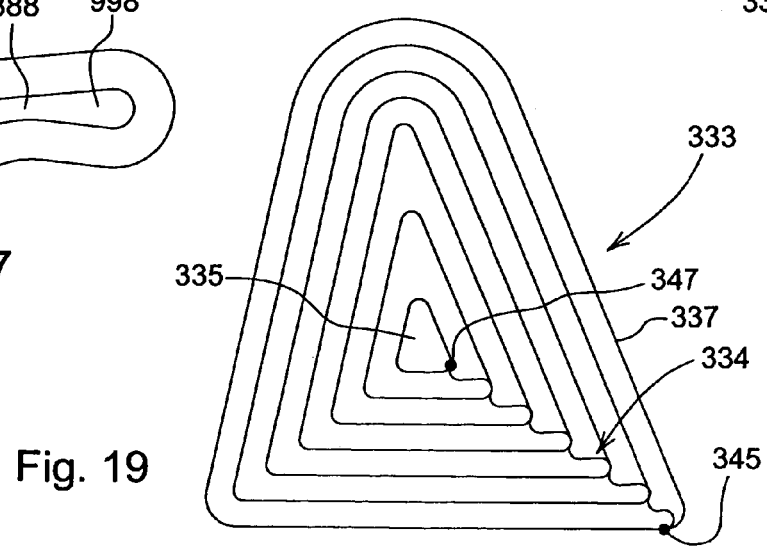
Fig. 19

PATH PLANNER AND METHOD FOR PLANNING A PATH PLAN HAVING A SPIRAL COMPONENT

This application is a continuation-in-part of U.S. application Ser. No. 10/446,345, filed May 28, 2003, now U.S. Pat. No. 6,934,615 and entitled METHOD AND SYSTEM FOR DETERMINING AN EFFICIENT VEHICLE PATH, which is a continuation-in-part of U.S. application Ser. No. 10/403,681, filed Mar. 31, 2003, now U.S. Pat. No. 7,010,425, and entitled, A PATH PLANNER AND A METHOD FOR PLANNING A PATH OF A WORK VEHICLE.

FIELD OF THE INVENTION

This invention relates to a path planner and a method for planning a path having a spiral component.

BACKGROUND OF THE INVENTION

A path planner may be used to determine one or more path plans for a vehicle to cover a work area. The work area may represent a field for growing a crop or other vegetation. The vehicle may need to traverse the entire work area or a portion thereof to plant a crop (or precursor thereto), to treat a crop (or precursor thereto), to harvest a crop, or to perform another task associated with the crop or vegetation, for example. If the path plan is limited to linear rows, the execution of the path plan may consume more energy than desired to traverse sloped terrain or to cover a given work area in an energy efficient manner. Accordingly, there is a need for a system and a method for applying a path plan with a spiral component for the vehicle to the work area.

SUMMARY OF THE INVENTION

A method and path planner for planning a path of a vehicle comprises a perimeter training module for identifying a border of a region associated with a work area. A definer defines a reference row having a reference path that tracks at least a majority of the border. A generator generates tracking rows that track the reference row. The tracking rows comprise at least one outer tracking row and an inner tracking row. Each inner tracking row has at least one inner curve with a lesser radius than an outer curve of an outer tracking row.

BRIEF DESCRIPTION OF THE DRAWINGS

FIG. 15 though FIG. 17, inclusive, are illustrative examples of various path plans having spiral components and pinch regions.

FIG. 18 through FIG. 20, inclusive, are illustrative examples of forming tracking rows of a path plan in accordance with a first technique (e.g., graduated technique) in accordance with the method FIG. 8.

DESCRIPTION OF THE PREFERRED EMBODIMENT

A spiral component means any of the following: (1) a path plan or contour rows that follows a generally spiral path, (2) a path plan or contour rows that comprises a series of nested loops (e.g., concentric paths or concentric path rings) that are interconnected to one another, (3) a path plan or contour rows having a continuous curve of variable radius that begins from an outer border and works inward, and (4) a path plan or contour rows having a continuous curve of variable radius from an inner border and works outward.

Figure 1:
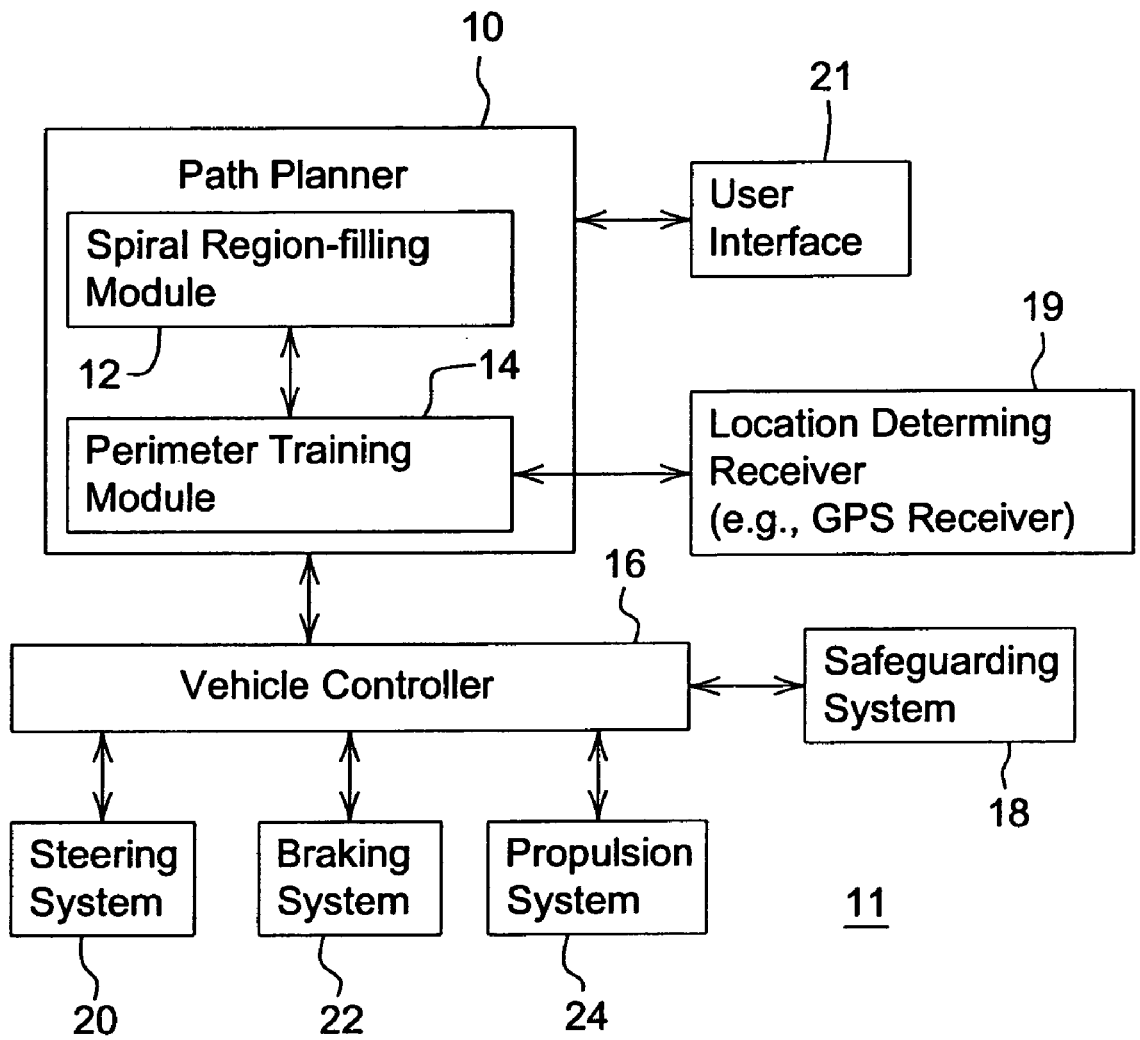
FIG. 1 is a block diagram of one embodiment of a path planner for planning a path of a vehicle incorporated into a vehicle electronics.

In FIG. 1, the path planning system 11 comprises a path planner 10 that is coupled to a user interface 21, a location-determining receiver 19, and a vehicle controller 16. In turn, the vehicle controller 16 may communicate with one or more of the following components: a steering system 20, a braking system 22, a propulsion system 24, and a safeguarding system 18.

Figure 2:
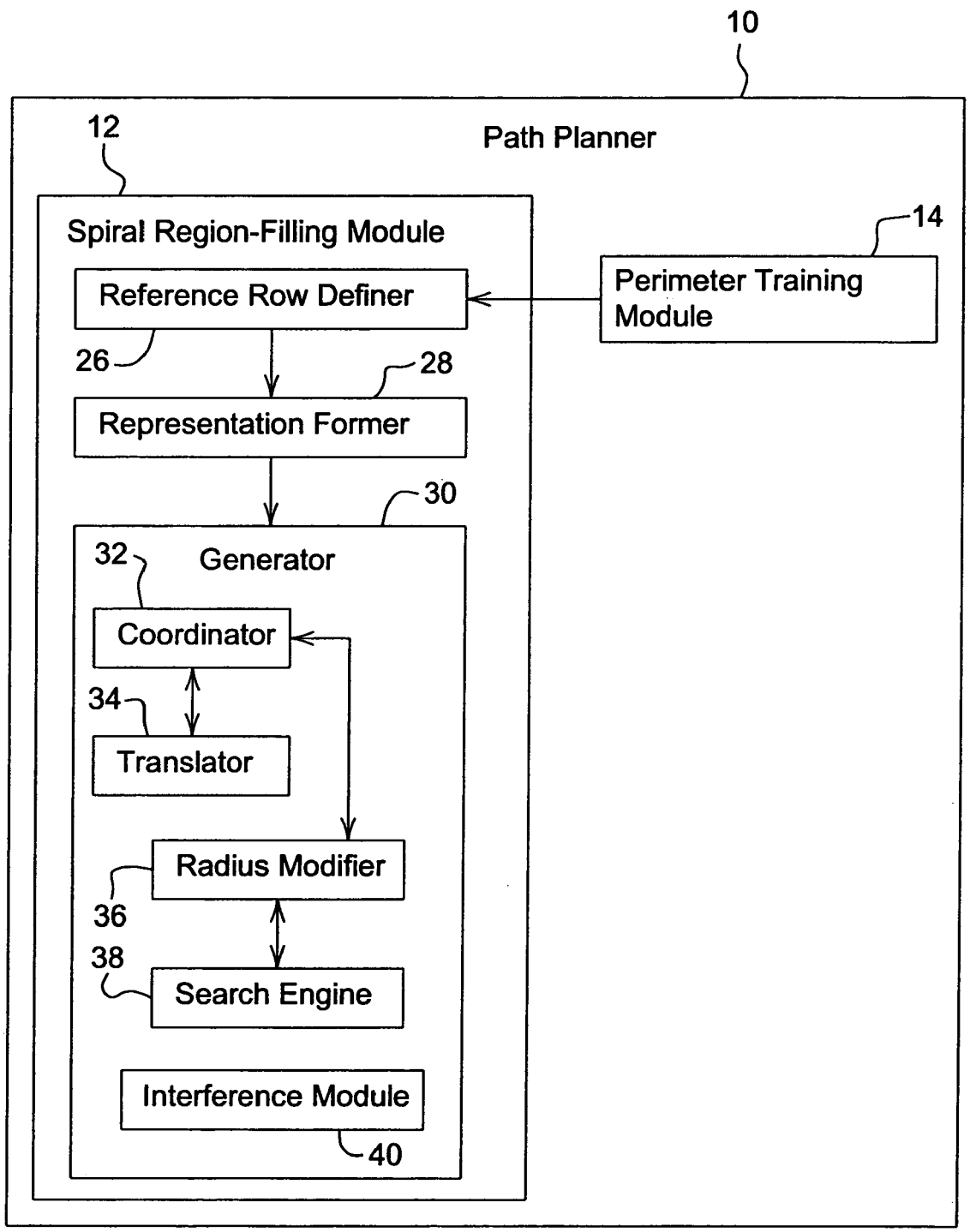
FIG. 2 is a block diagram of a path planner in accordance with the invention.

The path planner 10 of FIG. 1 comprises a perimeter training module 14 and spiral region-filling module 12. The path planning system 11 assumes that the boundary of the work area and each obstacle border has a closed shape. The perimeter training module 14 is arranged to collect location data on one or more points along the perimeter of the work area, stationary obstacles within the work area, or a defined region within the work area. For example, the perimeter training module 14 may collect location data (e.g., Global Positioning System coordinates) from the location-determining receiver 19 (e.g., GPS receiver with differential correction). The location data is made available to the spiral region-filling module 12 or to the reference row definer 26 (FIG. 2).

The spiral region-filling module 12 establishes a path plan comprising one or more spiral components or contour rows to cover the work area or a region thereof. Contour rows may be defined by curved components, generally linear components, or both. Although generally linear rows may be employed as part of a path plan, the path plan may be structured to support a spiral path plan to cover a region of the work area. For certain regions of a work area, spiral path plans may be more energy efficient and reduce fuel consumption over linear rows or other path plans. Whether or not spiral rows are more efficient than linear rows may depend upon an overall time, fuel consumption, energy consumption for completion of a spiral path plan versus a corresponding generally linear path plan.

The vehicle controller 16 accepts an input of the path plan from the path planner 10. The vehicle controller 16 controls the vehicle consistent with the path plan, unless the safeguarding system 18 detects an obstacle, obstruction, hazard, a safety condition, or another condition that requires the vehicle to depart from the planned path, to stop movement or take evasive measures to avoid a collision with an object or living being (e.g., a person or animal). The vehicle controller 16 may generate control signals for a steering system 20, a braking system 22, and a propulsion system 24 that are consistent with tracking the path plan and subject to modification or interruption by the safeguarding system 18. The control signals may comprise a steering control signal or data message that defines a steering angle of the steering shaft; a braking control signal or data message that defines the amount of deceleration, hydraulic pressure, or braking friction to the applied to brakes; a propulsion control signal or data message that controls a throttle setting, a fuel flow, a fuel injection system, vehicular speed or vehicular acceleration. Further, where the vehicle is propelled by an electric drive or electric motor, the propulsion control signal may control or modulate electrical energy, electrical current, electrical voltage provided to an electric drive or motor. The control signals generally vary with time as necessary to track the path plan.

The steering system 20 may comprise an electrically controlled hydraulic steering system, an electrically driven rack and pinion steering, an Ackerman steering system, or another steering system. The braking system 22 may comprise an electrically controlled hydraulic braking system, or another electrically controlled friction braking system. The propulsion system 24 may comprise an internal combustion engine, a internal combustion engine-electric hybrid system, an electric drive system, or the like.

The safeguarding system 18 may comprise an obstacle detection system, which includes one or more of the following components: an ultrasonic detector, a radar device, a laser obstacle detector, a ladar device, a laser range finder, a vision obstacle detector, and a stereo vision detector.

FIG. 2 is a block diagram of a path planner 10. FIG. 2 shows the path planner 10 of FIG. 2 in greater detail than that of FIG. 1. The path planner 10 comprises a spiral region-filling module 12. The spiral region-filling module 12 includes a reference row definer 26, a representation former 28, and a generator 30. The reference row definer 26 communicates with the representation former 28. In turn, the representation former 28 communicates with the generator 30.

The definer 26 defines the reference row having a reference contour. The reference contour may be defined in accordance with various techniques, which may be applied independently and collectively. Under a first technique, the definer 26 defines the reference row to follow along a boundary contour of a boundary of the work area. Under a second technique, the definer 26 defines the reference row to follow along a boundary contour of a boundary so that the reference row is contiguous with the boundary. Under a third technique, the definer 26 defines a reference row that tracks around an inner boundary (e.g., about an obstacle or no-entry zone) within the work area. In the first and second techniques, the path plan may be created to spiral inward toward a central area of the work area, whereas for the third technique the path plan may be created to spiral outward.

The representation former 28 may define spiral components or contour components of the path plan in accordance with one or more representations. Regardless of the representation, the spiral component or contour component may be defined as a curved component, a generally linear component, or both. Under a first representation, the representation former 28 defines the spiral component, a contour component, or path plan as a series of interconnected arc segments, linear segments, or both. In the first representation, the representation former 28 defines an arc segment as a center point, a start point, an end point and a radius, where any arc segment has a radius greater than the minimum turning radius of the vehicle. The representation former 28 defines the linear segment as two points. Under a second technique, the representation former 28 may define curved portions or arc segments of the path plan in accordance with other definitions or representations (e.g., graphical or mathematical representations, or curve equations).

The generator 30 comprises a coordinator 32, a translator 34 and a radius modifier 36 for determining a group of tracking contours or spiral components that track a reference contour within a region of a work area. The generator 30 further comprises a search engine 38 for determining values (e.g., radius values of curves) for contour or spiral components and an interference module 40 for resolving physical interference between candidate or proposed features of the path plan. The radius modifier 36 selects the radius difference parameter such that if the radius difference parameter generally equals the vehicular width, a nesting solution applies to adjacent rows on a local basis.

In one embodiment, the search engine 38 applies a search algorithm to possible candidate values of the radius difference parameter, wherein the search space is limited such that the radius difference parameter is bounded by a candidate radius difference parameter generally equal to or less than the vehicular width. For example, the search space is limited such that search is started with the radius difference parameter equal to the vehicular width and the radius difference parameter is decreased therefrom.

In one embodiment, the interference module 40 identifies the presence of two outside curved components (e.g., outside arcs) that are adjacent or separated by a linear component in an outer row located toward an outer boundary of the work area; the interference module 40 determines a single curved component (e.g., outside arc) for an inner tracking row that tracks the outer row. The inner tracking row is located closer to an interior of the work area than the outer row. In another embodiment, the interference module 40 identifies a presence of an inside curved component (e.g., arc) and an outside curved component being adjacent to each other, in a row where such inside curved component and outside curved component would cross over each other; and the interference module 40 applies a construction technique (e.g., iterative repair process) to reformulate a potentially noncompliant candidate row as a compliant row.

Figure 3:
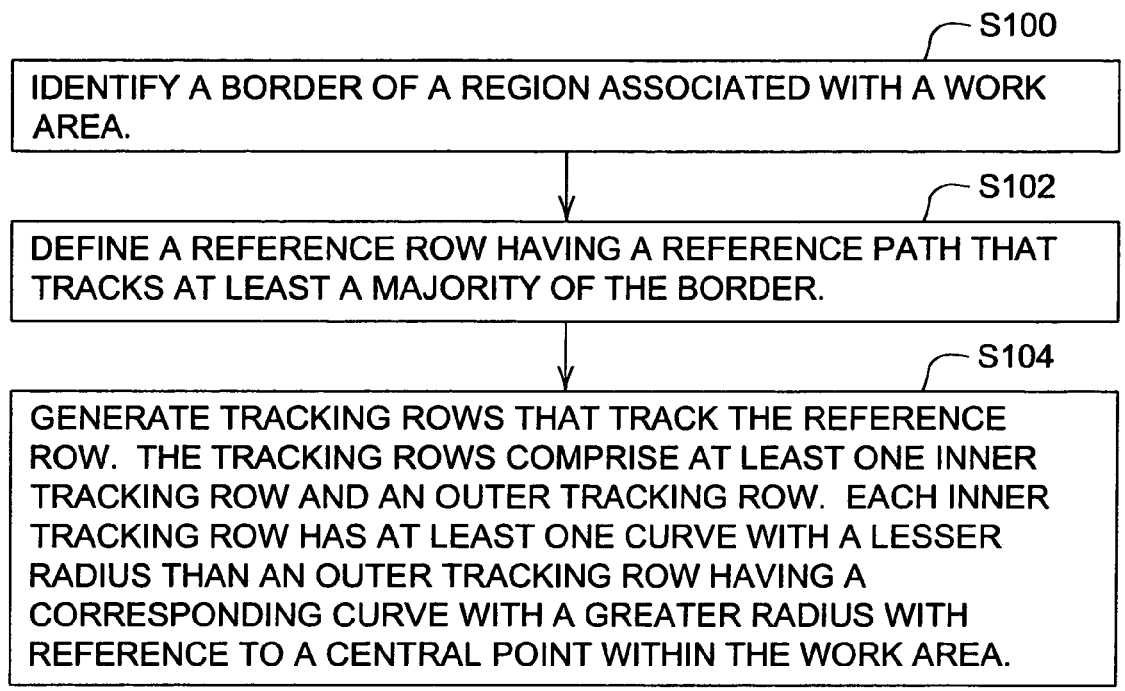
FIG. 3 is a flow chart of a method for creating a path plan having a spiral component for a vehicle in accordance with the invention.

FIG. 3 illustrates a method for planning a path of a vehicle in accordance with the invention. The method of FIG. 4 begins with step S100.

In step S100, a perimeter training module 14 or path planner 10 identifies a border of a region associated with a work area. For example, the perimeter training module 14 or path planner 10 may establish or define the border of the region or the work area as a series of points (e.g., two dimensional or three dimensional coordinates). The region may be coextensive with the work area, or a portion of the work area.

In step S102, a definer 26 or path planner 10 defines a reference row that has a reference path that tracks at least a majority of the border. In one example, the definer 26 or path planner 10 may track a majority of the outside border once prior to spiraling. In another example, the definer 26 or path planner 10 may track a majority of an inside border (e.g., obstacle located in an interior of the work area) prior to spiraling outward.

In step S104, a generator 30 or path planner 10 generates tracking rows that track the reference row. For an inward path plan with a spiral component, each tracking row comprises an inner tracking row with respect to an outermost row or reference row. For an outward path plan with a spiral component, each tracking row comprises an outer tracking row with respect to an innermost row or reference row. Each inner tracking row has at least one curve with a lesser radius than an outer tracking row has. The outer tracking row has a corresponding curve with a greater radius than the lesser radius.

Step S104 may be carried out in accordance with various techniques, which may be applied alternatively or cumulatively. Under a first technique, where the border comprises an outer border, the generator 30 or path planner 10 generates tracking rows that track inward from the reference row. Under a second technique, the generator 30 or path planner 10 tracks an inner border, the generating of tracking rows tracks outward from the reference row. Under a third technique, the border is generally circular and the tracking rows form a spiral with a varying radius that decreases toward an interior or center of the region.

Under a fourth technique, step S104 may generate tracking rows with a desired degree of overlap in accordance with various procedures that may be applied alternatively or cumulatively. Under a first procedure for the fourth technique, adjacent rows of spiral and contour patterns may overlap a previous row because at least one curved portion or new corners is constrained to use the vehicle minimum turn radius when a lesser turning radius would be more desirable to maintain a greater spacing between adjacent rows. Under a second procedure for the fourth technique, there is no overlap planned between adjacent rows. Rather, adjacent spiral rows inside the shape may be nested and constrained by the radius of the outside corners. Under a third procedure for the fourth technique, some overlap is permitted regardless of the vehicle minimum turning radius.

Under a fifth technique, the path planner 10 or interference module 40 detects corner interactions that prohibit the next contour row (or portion of the path plan with a spiral component) from being generated. Generating spiral shapes (or portions thereof) may exhibit problems with adjacent curves that cause problems in forming a spiral coverage path for some shapes of work areas, such that one or more of the following compensation techniques may apply: (1) using a spiral pattern for the first few rows and reverting to another pattern (e.g., a linear or contour coverage pattern) where the efficiency goals are satisfied; (2) issuing a stop parameter through to signal the path planning of a spiral path plan to stop when the spiral rows overlap a previous row by more than some specified maximum amount; (3) detecting a pinch region of the work area; (4) continuing spiral path plan generation or execution over the whole work area and then subsequently performing special clean-up laps to cover uncovered gaps (e.g., unmowed, untreated or unharvested gaps) that would be left between adjacent rows (e.g., in certain turn areas associated with the corners of the work area); (5) using flip turns in cases where the corners dictate a turn distance smaller than a certain threshold; and (6) first handling one or more local regions where spiral coverage pattern is suboptimal or inefficient by a back-and-forth linear coverage; and second, handling the remaining regions other than the local regions by executing a path plan having a spiral component.

Figure 4:
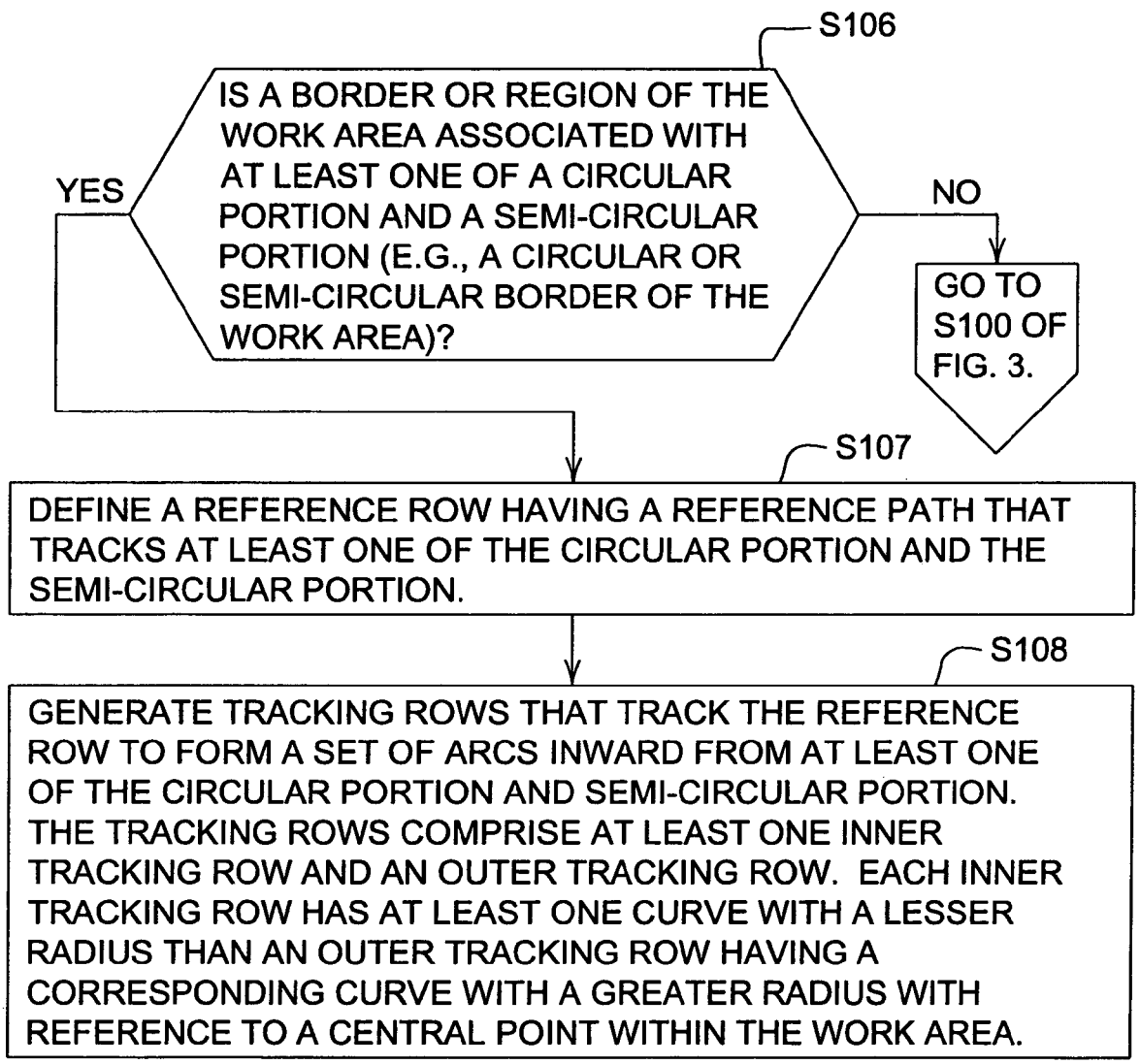
FIG. 4 is a flow chart of another method for creating a path plan for a vehicle in accordance with the invention.

The method of FIG. 4 may be applied to complement the method of FIG. 3. The method of FIG. 4 begins in step S106.

In step S106, the path planner 10 determines whether a border or region of the work area is associated with at least one of a circular portion and a semi-circular portion (e.g., a generally circular or semi-circular border). The work area may be associated with a circular portion or semi-circular portion if a threshold number of points conform or lie approximately on a geometric, mathematical or other representation of a circle, arc or semi-circle. If the border or region of the work area is associated with at least one of a circular portion and a semi-circular portion, then the method continues with step S107. However, if the border or region of the work area is not associated with a circular portion and a semi-circular portion, then the method continues with step S100 of FIG. 3.

In step S107, the path planner 10 or reference row definer 26 defines a reference row having a reference path that tracks at least one of the circular portion and the semi-circular portion. For example, the reference path may track the border with one or more overlap or clean-up rows necessary to refine or conform an irregular semi-circular border or circular border into a generally regular form, consistent with the definitions of semi-circle, circle or arc.

In step S108, the path planner 10 or generator 30 generates tracking rows that track the reference row to form a set of arcs or a variable radius arc inward from at least one of the circular portion and semi-circular portion. The tracking rows comprise at least one inner tracking row and an outer tracking row. Each inner tracking row has at least one curve with a lesser radius than an outer tracking row having a corresponding curve with a greater radius. For example, the variable radius arc is defined in accordance with the following equation:

Arc radius=a×theta, where a is the initial radius or outer radius of the work area (or the refined border) and wherein theta is a variable that reduces the initial radius as a function of angular displacement along a path and inward toward a central area of the region.

Figure 5A:
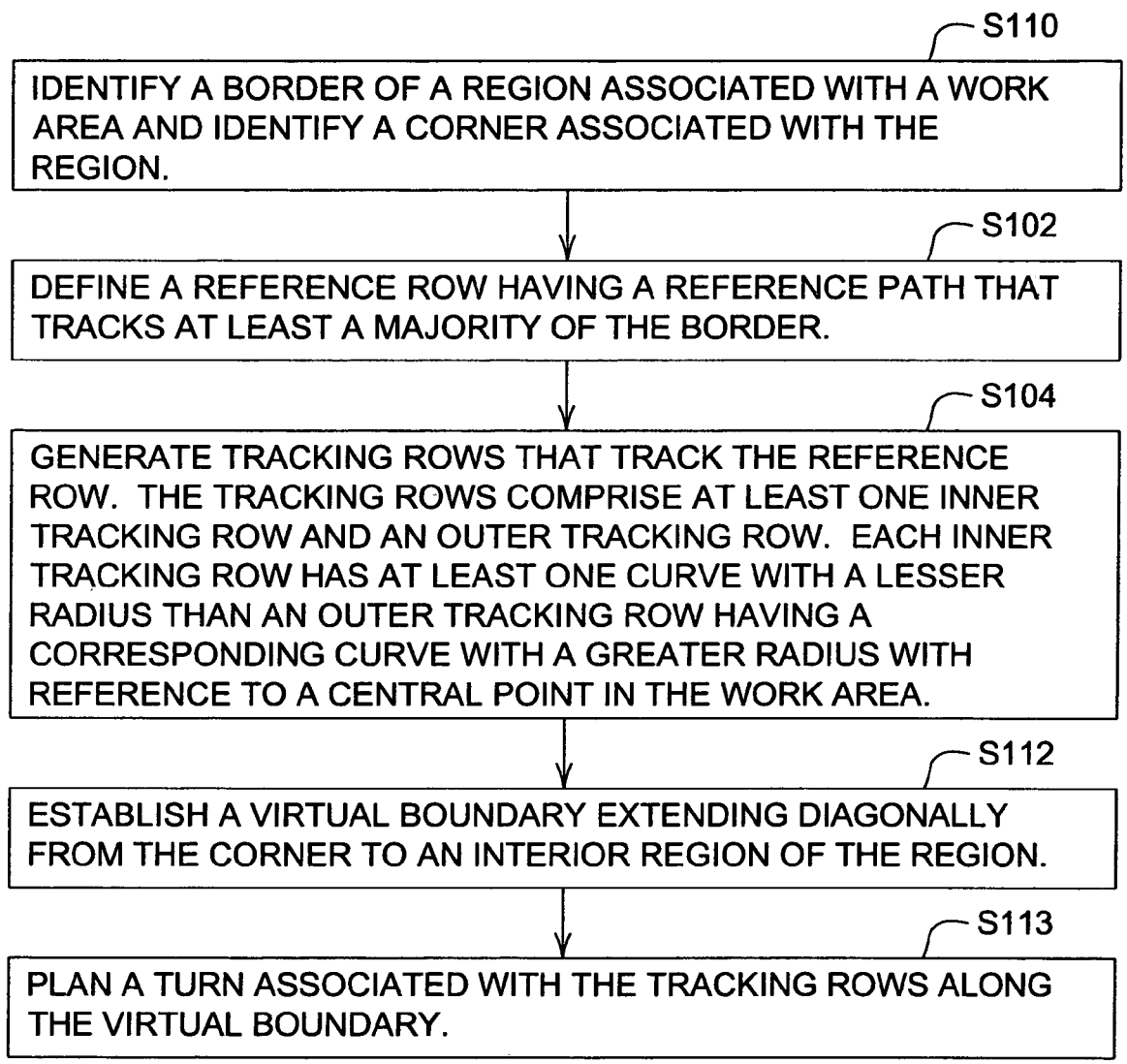
FIG. 5A is a flow chart of yet another method for creating a path plan for a vehicle in accordance with the invention.

FIG. 5A shows a method that may be applied following the method of FIG. 3 or FIG. 4. The method of FIG. 6 begins in step S110. Like reference numbers in FIG. 5 and FIG. 3 indicate like elements.

Step S110, may be integrated into step S100 or performed, before, after or during step S100. In step S110, path planner 10 identifies a border of a region associated with a work area and one or more corners associated with the border of the region.

In step S102, a definer 28 or path planner 10 defines a reference row that has a reference path that tracks at least a majority of the border. The description of step S102 set forth in conjunction with FIG. 2 applies equally here to FIG. 5A.

In step S104, a generator 30 or path planner 10 generates tracking rows that track the reference row. The tracking rows comprise at least one inner tracking row and an outer tracking row. Each inner tracking row has at least one curve with a lesser radius than an outer tracking row has. The outer tracking row has a corresponding curve with a greater radius that than the lesser radius. The various techniques for executing step S104 in FIG. 3 apply equally to FIG. 5 as if fully set forth herein.

In step S112, a generator 30 or path planner 10 establishes a virtual boundary extending diagonally from the identified corner or corners to an interior region of the region (e.g., work area).

In step S113, a generator 30 or path planner 10 plans a turn between tracking rows along or in a vicinity of the virtual boundary. For example, the path planner 10 may plan a flip turn in which the vehicle switches or reverses direction such that the vehicle is heading in substantially opposite direction in an subsequent row with respect to a previous row. The flip turn may be executed such that the vehicle returns along an adjacent row that is generally parallel to an immediately previously executed row. Alternatively, the flip turn may be implemented such that one or more intervening rows are skipped while making the flip turn.

Figure 5B:
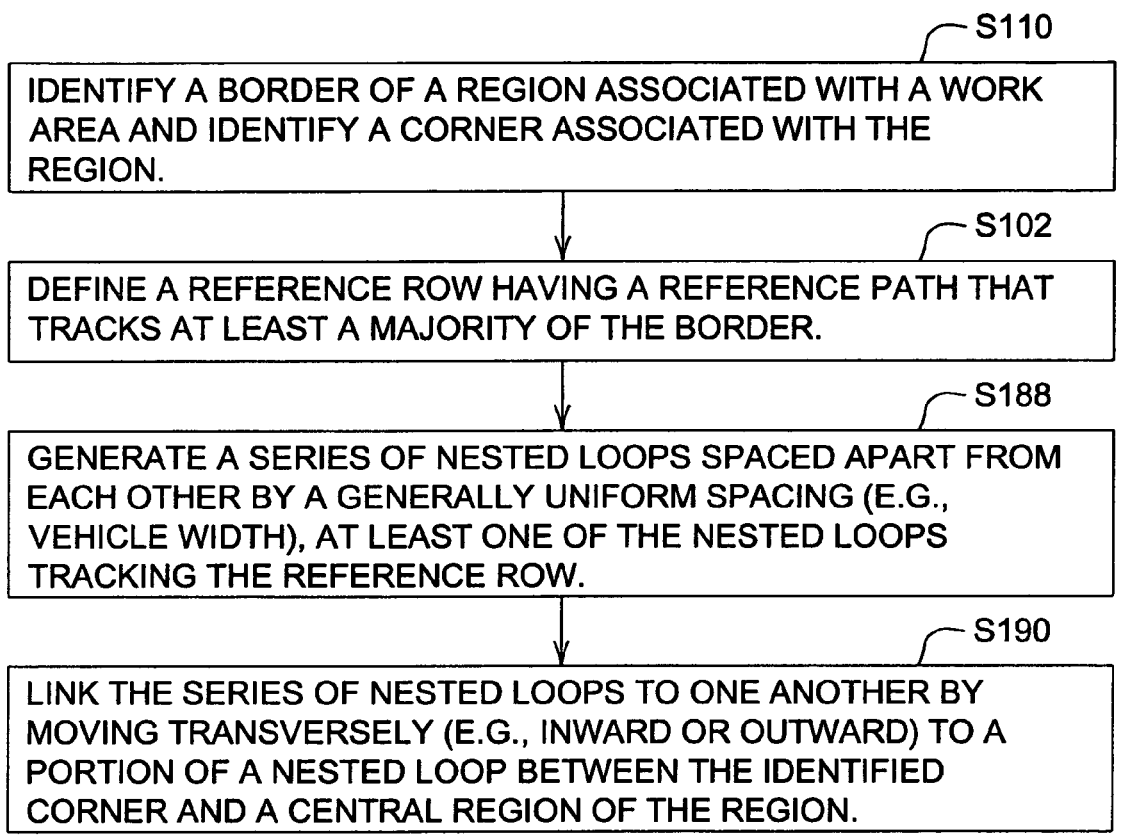
FIG. 5B is a flow chart of still another method for creating a path plan for a vehicle in accordance with the invention.

The method of FIG. 5B is similar to the method of FIG. 5A, except the method of FIG. 5B replaces steps S112 and S113 with steps S188 and S190. Like reference numbers in FIG. 5A and FIG. 5B indicate like steps or procedures. Because steps S110 and S102 have already been described in conjunction with FIG. 5A, the explanation here will start with step S188.

In step S188, the generator 30 or path planner 10 generates a series of nested loops spaced apart from each other by a generally uniform spacing (e.g., vehicle width). At least one of the nested loops tracks the reference row. Where the reference row is the outermost row associated with a border of the work area, the next inner loop tracks the outermost row. Where the reference row is the innermost row associated with the border of an obstacle in a central portion of the work area, the next outer loop tracks the innermost row. The generally uniform spacing may comprise a vehicle width, an implement width, a cutting width, a swath, an operation width or the like. Further, the generally uniform spacing may include an offset or overlap allowance between adjacent nested loops.

In step S190, the generator 30 or path planner 10 links a series of nested loops to one another by moving transversely (e.g., inward or outward) to a portion of a nested loop between the identified corner and a central area of the region or work area. The vehicle may make more gradual or maneuverable turns where the transverse movement occurs along the virtual boundary between the identified corner and a central area, as opposed to requiring the transverse movement along other portions of the nested loops.

Figure 6:
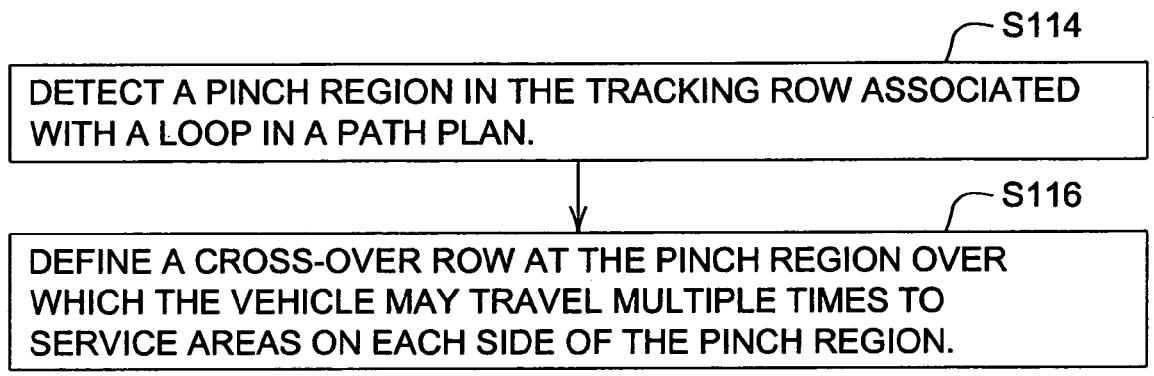
FIG. 6 is a flow chart of a first procedure for handling a pinch region of the path plan.

FIG. 6 shows a method that may be applied following the method of FIG. 3 or FIG. 4. The method of FIG. 6 begins in step S114.

In step S114, a pinch detector or interference module 40 detects a pinch region in a tracking row associated with a loop in a path plan. A pinch region refers to a narrow region or bottleneck in the work area in which a spiral path plan is constrained or prevented from realization. For example, the narrow region may be present because of a natural features, topographical features, land ownership boundaries, geopolitical boundaries, or other particular boundaries of the work area.

In step S116, the generator 30, path planner 10, or interference module 40 defines a cross-over row at the pinch region over which the vehicle may travel multiple times to service area on each side of the pinch region within the work area. For example, each complete lap (e.g., spiral) of the path plan may cross the pinch region twice, until all laps have been completed. Uncovered or remnant areas on either side of the pinch region may be covered by back and forth linear sweeps.

Figure 7:
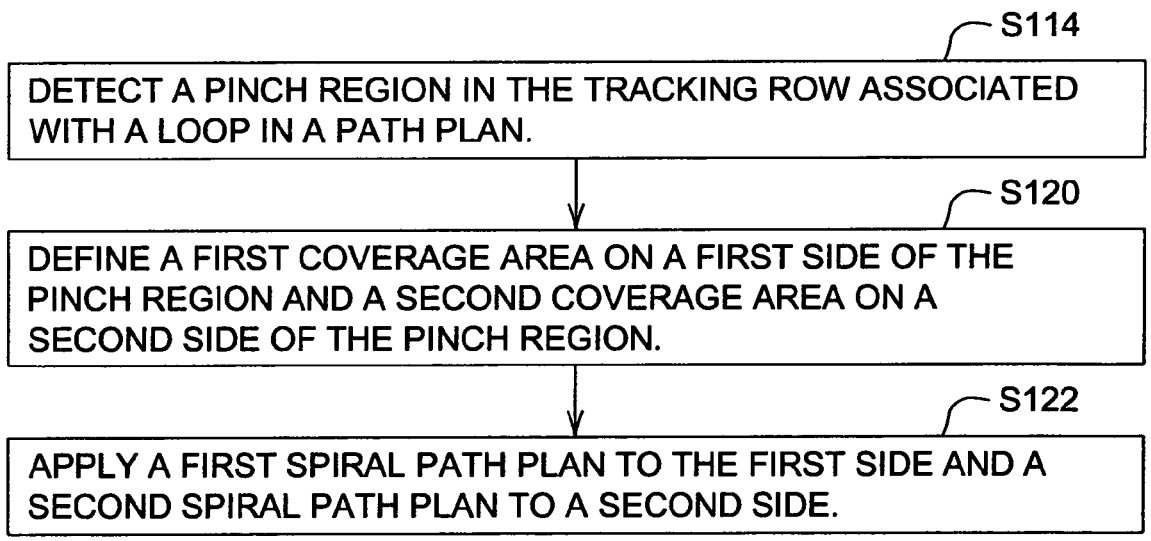
FIG. 7 is a flow chart of a second procedure for handling a pinch region of the path plan.

FIG. 7 shows a method that may be applied following the method of FIG. 3 or FIG. 4. The method of FIG. 7 may be applied as an alternative to that of FIG. 6. The method of FIG. 7 begins in step S114.

In step S114, a pinch detector or interference module 40 detects a pinch region in a tracking row associated with a loop in a path plan. A pinch region refers to a narrow region or bottleneck in the work area in which a spiral path plan is constrained or prevented from realization. For example, the narrow region may be present because of a natural features, topographical features, land ownership boundaries, geopolitical boundaries, or other particular boundaries of the work area.

In step S120, a generator 30, a path planner 10, or an interference module 40 defines a first coverage area on a first side of the pinch region and a second coverage area on a second side of the pinch region.

In step S122, the generator 30 or path planner 10 applies a first spiral path plan to the first side and a second spiral path plan to a second side. For example, the path plan comprises first completing a first spiral path plan or firth path plan having a spiral component; second, crossing over the pinch area from the first side to the second side; and third, completing a second spiral path plan or second path plan having a spiral component on the second side.

Figure 8:
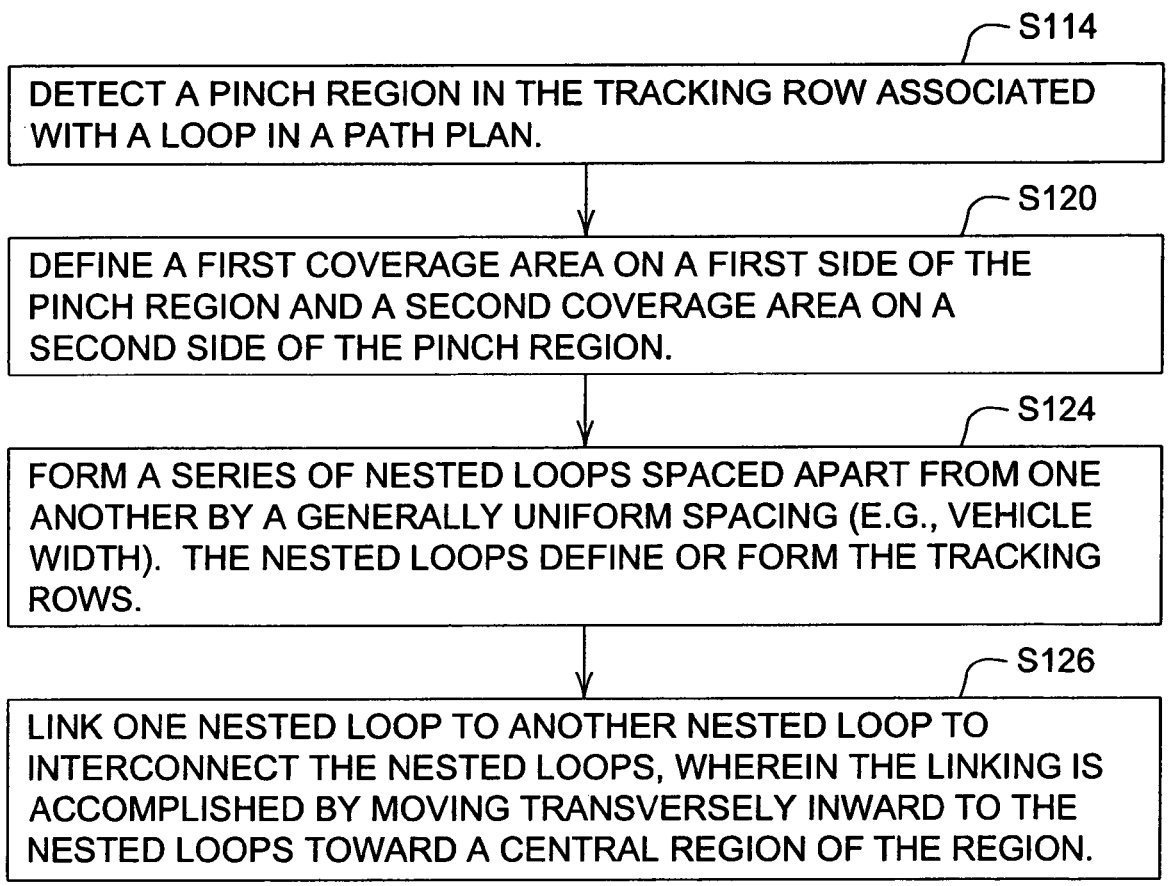
FIG. 8 is a flow chart of a third procedure for handling a pinch region of the path plan.

The method of FIG. 8 is similar to the method of FIG. 7, except step S124 and S126 of FIG. 8 collectively replace step S122 of FIG. 7. The method of FIG. 7 begins with step S114. Like reference numbers in FIG. 7 and FIG. 8 indicate like elements.

In step S114, a pinch detector or interference module 40 detects a pinch region in a tracking row or loop associated with a loop in a path plan. A pinch region refers to a narrow region or bottleneck in the work area in which a spiral path plan is constrained or prevented from realization. For example, the narrow region may be present because of a natural features, topographical features, land ownership boundaries, geopolitical boundaries, or other particular boundaries of the work area.

In step S120, a generator 40, a path planner 10, or an interference module 40 defines a first coverage area on a first side of the pinch region and a second coverage area on a second side of the pinch region.

In step S124, a generator 10 or path planner 10 forms a series of nested loops spaced apart from one another by a generally uniform spacing (e.g., vehicle width, the nested loops defining the tracking rows). The generally uniform spacing may comprise one or more of the following: vehicle width, vehicle width less an overlap allowance, implement width, implement width less an overlap allowance, cutting width, swath, harvesting width, spraying width, distribution width, or treatment width, and cutting width, swath, harvesting width, spraying width, distribution width, or treatment width, less an overlap allowance. Step S124 may be carried out by forming a first series of nested loops for the first coverage area and forming a second series of nested loops for the second coverage area.

In step S126, the generator 10 or path planner 10 links one nested loop to another nested loop to interconnect the nested loops. For example, the linking is accomplished by moving transversely inward to the nested loops toward a central area of the region.

Figure 9:
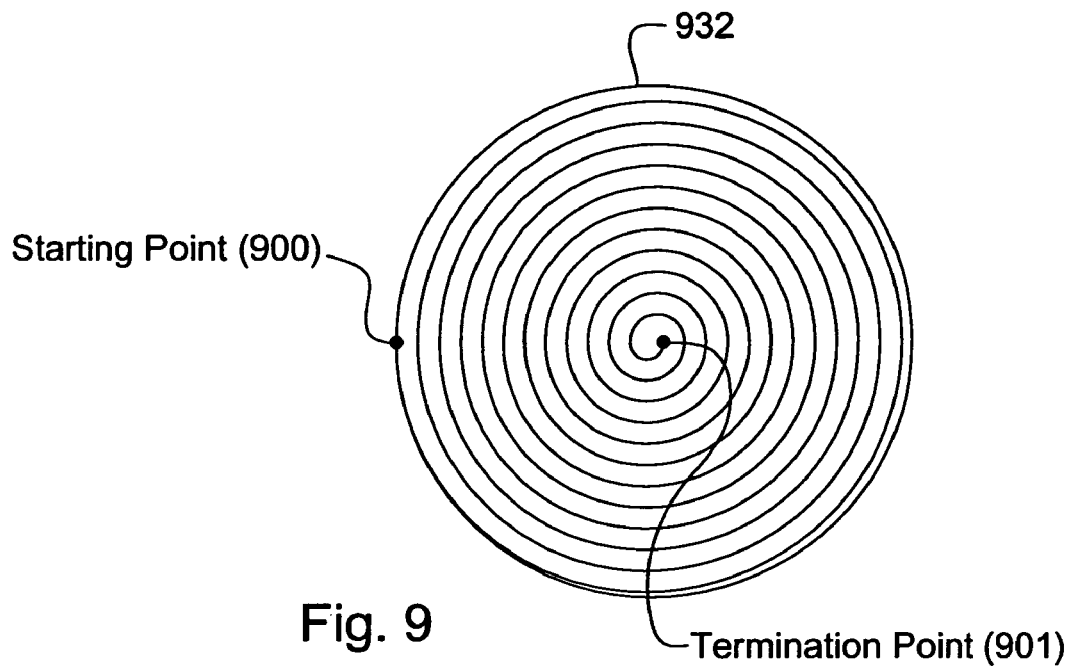
FIG. 9 is an illustrative path plan formed as an Archimedean spiral.

FIG. 9 illustrates work area or region of the work area that has a generally circular portion, consistent with step S106 of FIG. 4. Here, because the work area is generally circular, an Archimedean spiral may be used to cover the work area with no or minimal overlap between radially spaced curved portions (e.g., adjacent contour rows) of the spiral. Archimedean spirals generally have a generally uniform or constant spacing (e.g., vehicular width) of the rows throughout the spiral pattern. However, strict adherence to the Archimedean spiral shape may cause a greater than the ideal amount of overlap in the outermost two laps of the path plan. The Archimedean spiral of FIG. 9 may have a radius that is consistent with the following equation. Radius=a*theta. Although FIG. 9 illustrates the starting point 900 of the path plan on an outer boundary of the work area 932 or region and a termination point 901 in a central area of the work area 932, the vehicle may start the path plan at a center of the work area or region, as an alternative. For example, the path plan may be established from the starting point 900 to the termination point 901 where the path plan with the spiral component proceeds inwardly, or vice versa where the path plan with the spiral component proceeds outwardly. For the case where the vehicle starts from the outer boundary, the vehicle may follow the entire boundary shape before it starts to spiral inward to ensure that there is no missed area of the work area.

Figure 10:
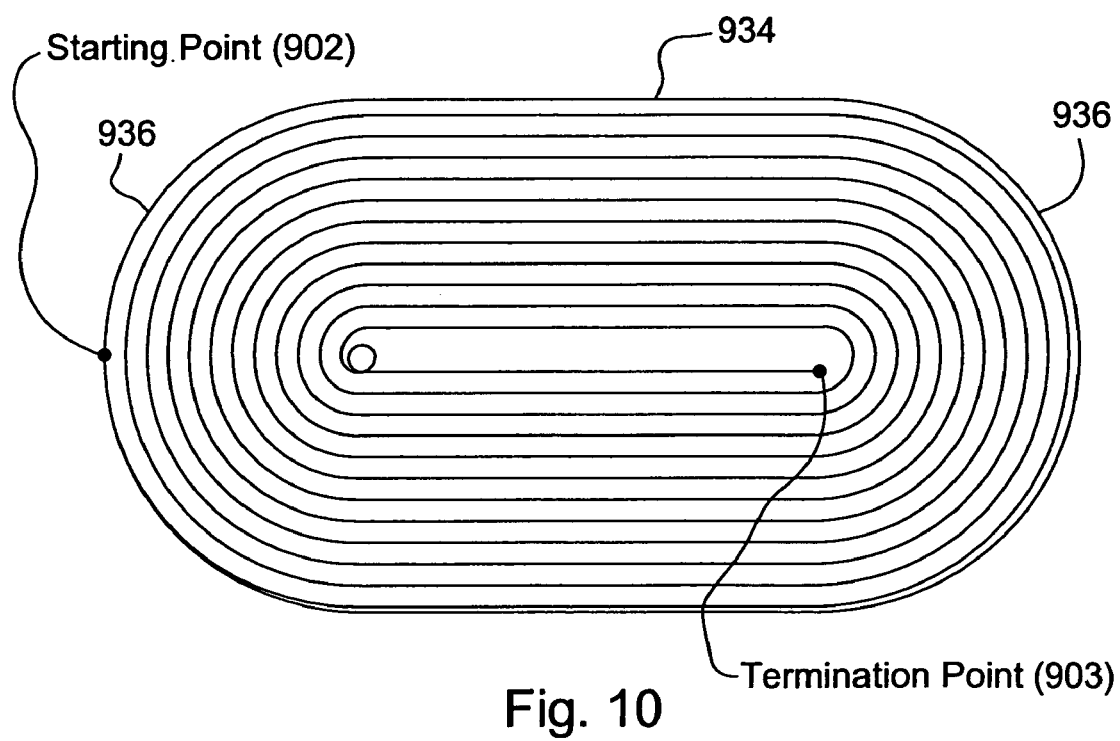
FIG. 10 is an illustrative path plan as a modified Archimedean spiral.
Figure 11:
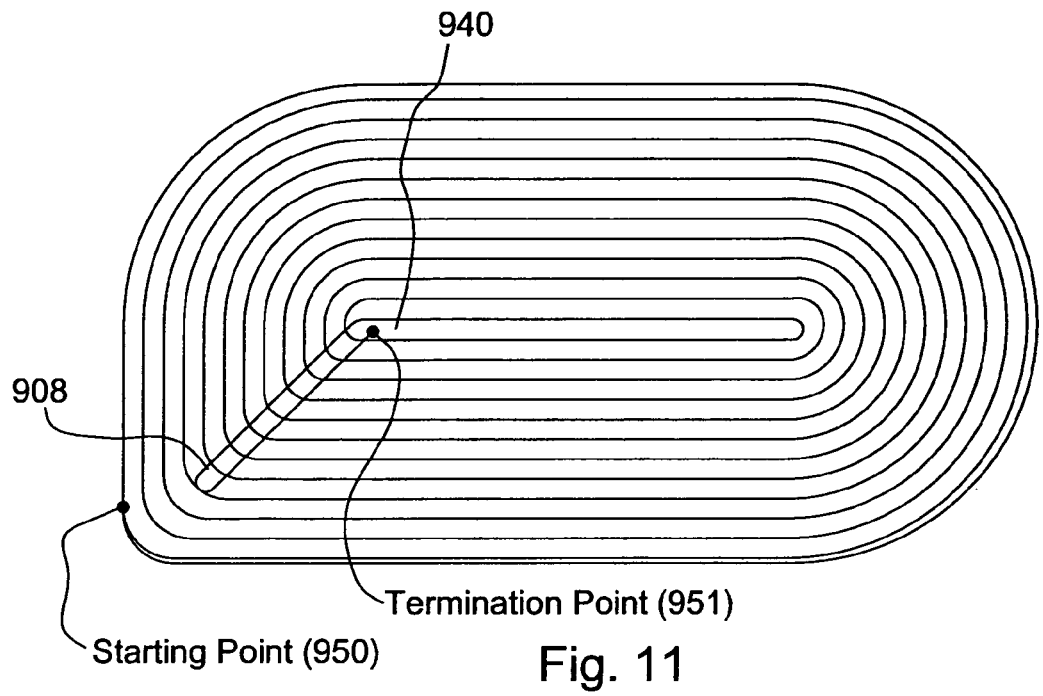
FIG. 11 through FIG. 14, inclusive, are illustrative examples of various path plans having spiral components.
Figure 12:
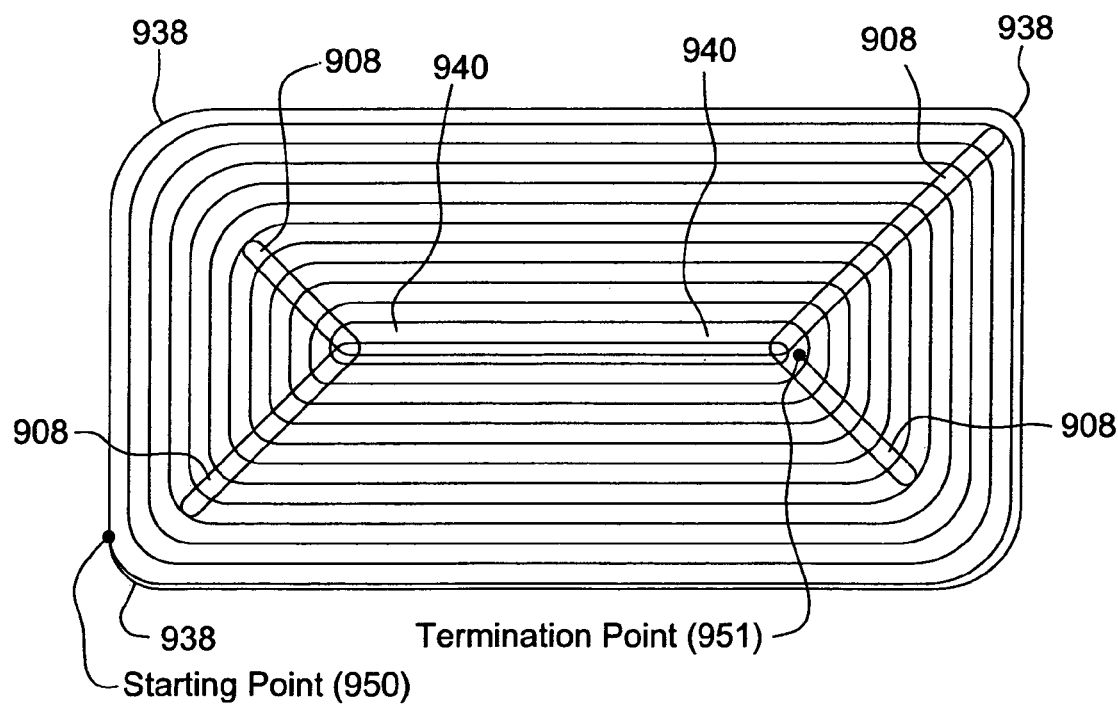
Figure 13:
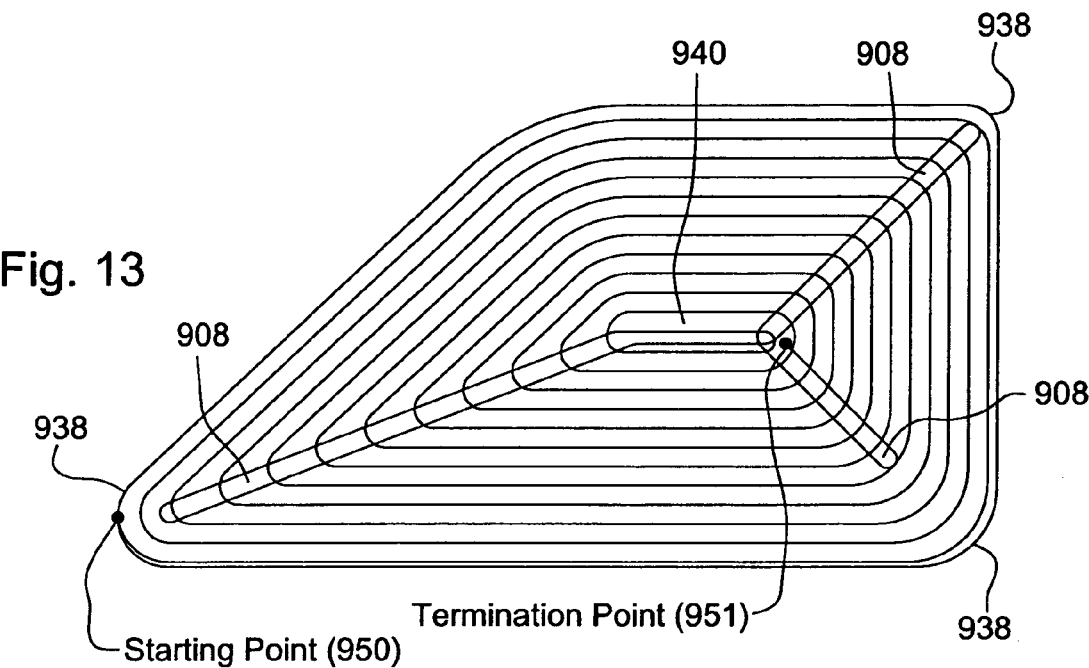
Figure 14:
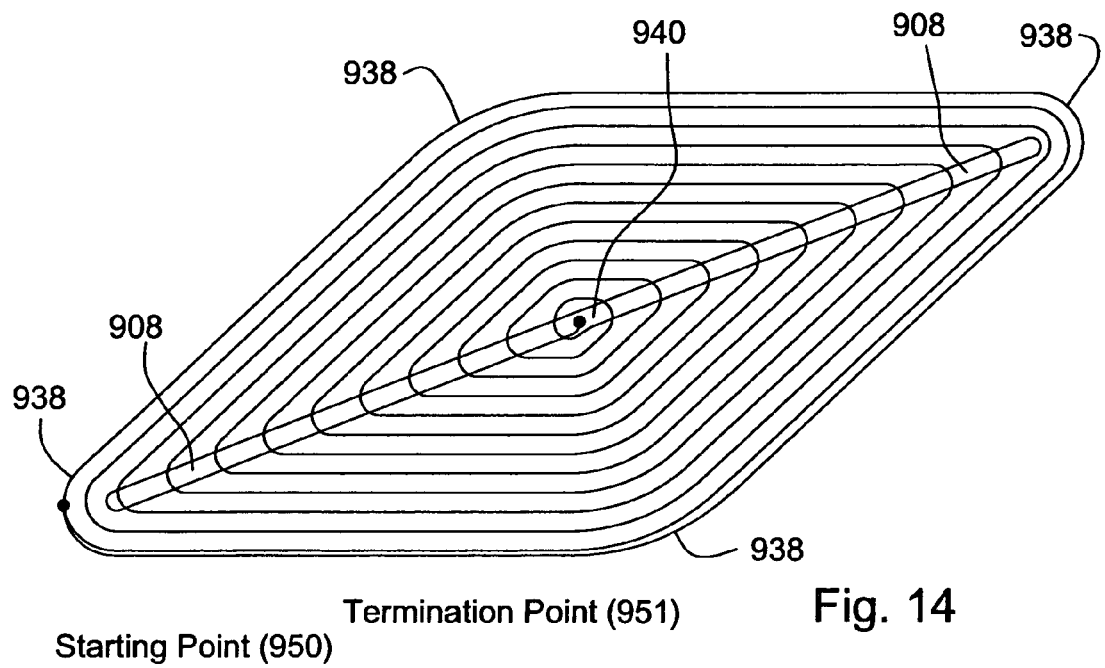

FIG. 10 illustrates work area 934 or region of the work area that includes two generally semi-circular portions 936, consistent with step S106 of FIG. 4. Here, an Archimedean spiral or another spiral configuration may be used to cover the work area with no or minimal overlap between radially spaced curved portions of the spiral. Although FIG. 10 illustrates the starting point 902 of the path plan on an outer boundary of the work area or region, the vehicle may start the path plan at a center of the work area or region from the termination point 903, as an alternative. For example, the path plan may be established from the starting point 902 to the termination point 903 where the path plan with the spiral component proceeds inwardly, or vice versa where the path plan with the spiral component proceeds outwardly.

Path plans with spiral components in FIG. 11 through FIG. 14 are representative of path plans with virtual boundaries 908 of step S112 of FIG. 5A and turns of step S113 of FIG. 5A. The virtual boundaries 908 of FIG. 11 through FIG. 14 may be described as generally oval shapes (e.g., finger-like shapes) that extend diagonally between a corner 938 and an interior or central area 940 of the work area. In one embodiment, the generally oval shapes coincide with paths which represent clean-up laps that are required because the path plan with spiral components (e.g., nested arcs or minimum turn arcs) tend to leave a gap (e.g., uncut, unmowed, unharvested or untreated vegetation, which is sometimes shaped like partial moon) between the previous rows.

In an alternative embodiment, the generally oval clean-up lap may be replaced by one or more flip turns in region of the virtual boundary 908. For example, flip turns may be executed in the innermost rows of the path plan. Flip turns (e.g., approximately 180 degree turns) allow the vehicle to turn back on the next row without skipping any rows or intermediate rows.

Each of the path plans with spiral components shown in FIG. 11 through FIG. 14, inclusive, includes a starting point 950 and a termination point 951. Although the path plans begin at the starting point 950 toward an outer boundary of the work area and move inwardly toward a central area 940, in an alternate embodiment any of the path plans may begin at the termination point 951 and move outwardly toward an outer boundary of the work area (e.g., toward the starting point 950). If an obstacle is present in the central area 940, an inner boundary of the work area may be coextensive with a zone boundary of an obstacle clearance zone about the obstacle.

The path plans in FIG. 15 through FIG. 17 show partially complete or incomplete path plans which have pinch regions 888. The pinch regions 888 of FIG. 15 through FIG. 17 are illustrative of potential pinch regions set forth in step S114 of FIG. 6, FIG. 7, and FIG. 8. In general, a spiral may be subject to a pinch region (e.g., 888), if a shape of a work area (e.g., figure-eight shaped) or a region thereof is susceptible or conducive to such pinching. When a spiral path plan pinches, it may produce discontinuities, or awkwardness in the path plan that could potentially leave large uncovered areas for a spiral path plan or a path plan having a spiral component. Although the partial path plans with the spiral components in FIG. 15 through FIG. 17 are linked by links 890 or transverse portions to move from one nested loop 992 to another nested loop 994, other configurations of the path plans are possible, such as continuous spiral path plans as disclosed elsewhere herein.

There are various ways to handle a pinch region in planning an acceptable resultant path plan. Under a first technique, the path planner 10 forms a path plan that crosses over the pinch location on multiple passes (e.g., continually) to move from a first area on one side of the pinch region to a second area on another side of the pinch region. The cross-over technique is referenced in step S116 of FIG. 6.

Under a second technique for handling a pinch region, the path planner 10 makes new sub-path plans out of the areas associated with the pinch region and starts a new spiral path plan in each area. For example, the path planner 10 may establish a first spiral plan to a first side of the pinch region and a second spiral plan for a second side of the pinch region. Refer to FIG. 15 through FIG. 17 to see an illustrative example of the first side (e.g., first side 996) and the second side (e.g., second side 998). Further, where the vehicle generally remains on a first side until completion of the first spiral plan and then moves through the pinch region to focus on the second spiral plan. The second technique may be referred to as a sequential side execution technique. The sequential side execution technique is described in conjunction with step S122 of FIG. 7.

Figure 20:
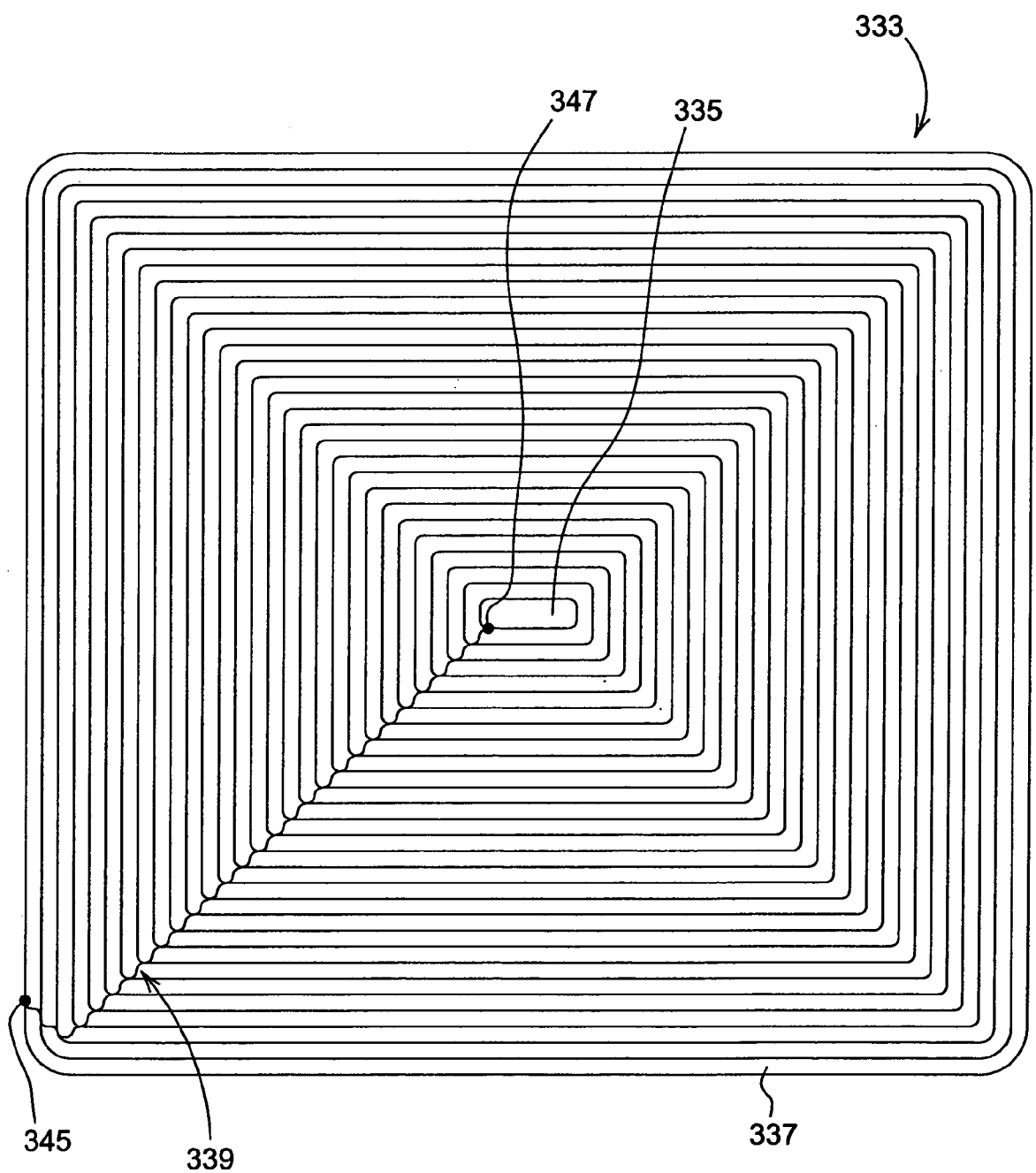

Each path plans in FIG. 18 through FIG. 20 comprises a series of nested contours or nested loops 333. The starting points 345 and termination points 347 are labeled. Although the order of execution of the path plan generally extends from the starting point 345 to the termination point 347, it may be reversed such that any path plan begins from the termination point 347 and ends with the starting point 345. The contours or nested loops range from an innermost contour or innermost loop 335 to an outermost contour or outermost loop 337. Each inner contour is linked to an adjacent contour by a transition link. Each transition link 339 is transverse or generally perpendicular with respect to its nested contour or loop 333. The path plans of FIG. 18 through FIG. 20 are consistent with the path plan of FIG. 5B and with step S126 of FIG. 8. However, it should be noted that the path plan of FIG. 18 is only partially complete as shown in FIG. 18. The unfilled regions of the path plan with the spiral component may be filled by a spiral component in a first region 341 and a linear coverage plan in a second region 343.

The path plans of FIGS. 18 through 20 are applicable to irregular shaped regions as in FIG. 18, generally triangular regions as in FIG. 19, and generally rectangular regions as in FIG. 20, for example. The path planner may form any path plan of FIG. 18 through FIG. 20 by using an outer boundary as the template and spacing loops inward from the outer boundary by successive multiples of generally uniform spacing (e.g., vehicle widths, track widths, vehicle widths less an overlap allowance, or track widths less an overlap allowance) until the final central area is reached where insufficient room for a loop exists or the vehicle minimum turning radius is unable to execute the next loop (e.g., inward from the innermost loop). The final central area (e.g., unmowed, unharvested or untreated area) that is left inside a spiral pattern may be covered using a back-and-forth sweep pattern as part of the path plan having a spiral component. For example, the path planner 10 may select the longest side, linear segment or curved portion of final central area as the reference line or contour. The other rows of the back-and-forth sweep pattern are generally tracking or parallel to the reference line or contour.

Figure 21:
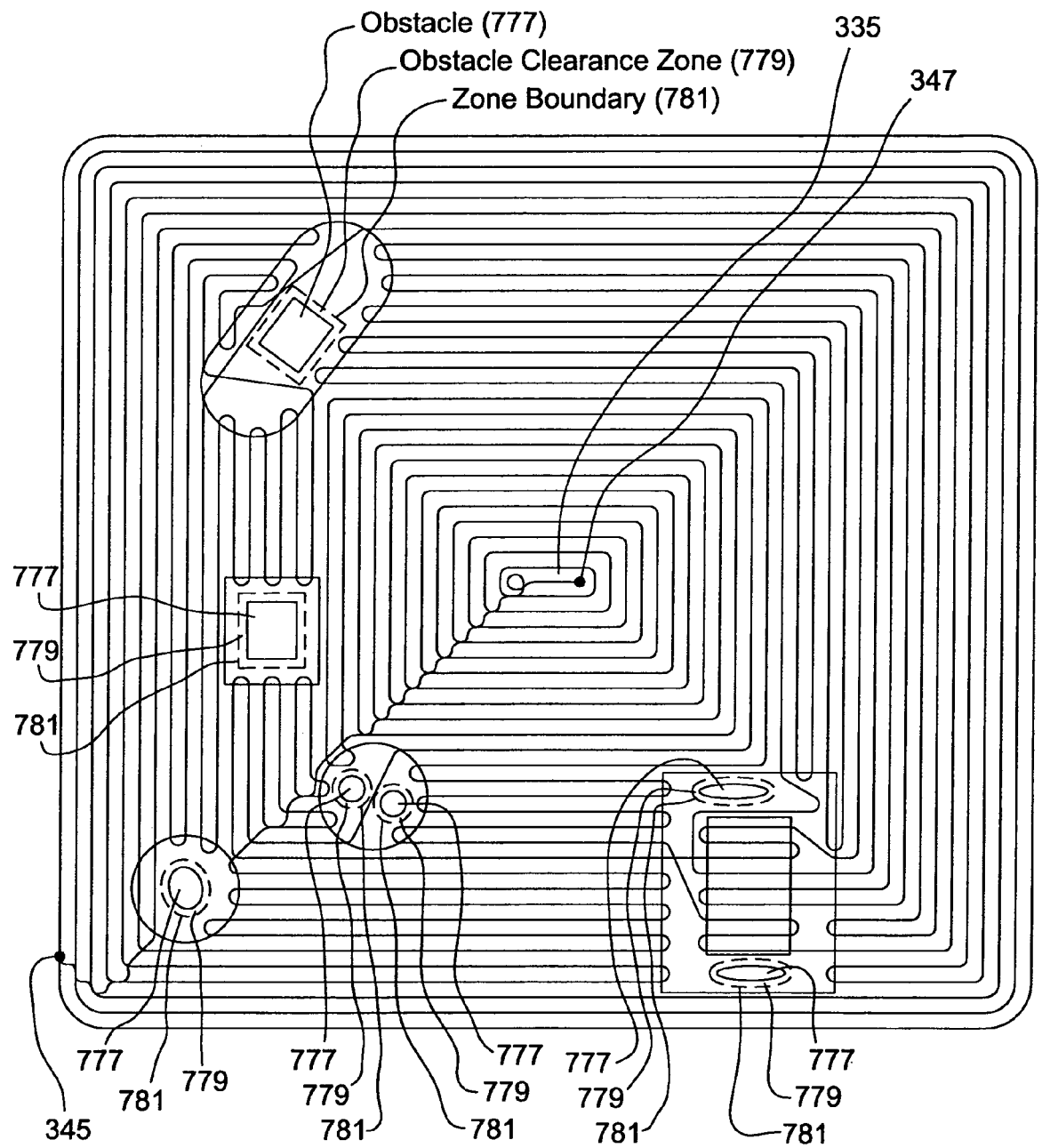
FIG. 21 is an illustrative example of a path plan having a spiral component and avoiding obstacles.

FIG. 21 is an illustrative example of a path plan having a spiral component and avoiding internal obstacle areas. The path plan of FIG. 21 is similar to the path plan of FIG. 20, except for the obstacles. Where the obstacles are present, the path plan turns. Each turn to avoid striking an obstacle may result in the vehicle's tracking adjacent rows in generally opposite directions. The rows illustrated in FIG. 20 do not require generally oval clean-up laps and flip turn as previously illustrated.

The path plan is composed of a series of nested loops, that are interconnected with interconnection links. The nested loops may be spaced apart by a generally uniform spacing (e.g., the vehicle width, the task width, the vehicle width less an overlap allowance, or the task width less an overlap allowance). The interconnection links may be found along a virtual boundary that extends diagonally from the corner to an interior region of the work area.

In FIG. 21, the vehicle may start on the outside border of the work area and spirals inward until the next spiral row cannot be created. At this point in the central area, the coverage solution finishes the inside area using a back and forth sweep pattern. This example also has a number of internal obstacles. The work area of FIG. 21 contains a number of obstacles 777. Each obstacle 777 is surrounded by an obstacle clearance zone 779 into which a turn may occur so long as the obstacle 777 is not impacted, contacted or struck. The obstacle clearance zone 779 is associated with a zone boundary 781, which is coextensive with an outer perimeter or outer periphery of the corresponding obstacle clearance zone 779 about a respective obstacle 777. Here, the zone boundary 781 is shown as one or more dashed lines.

Figure 22:
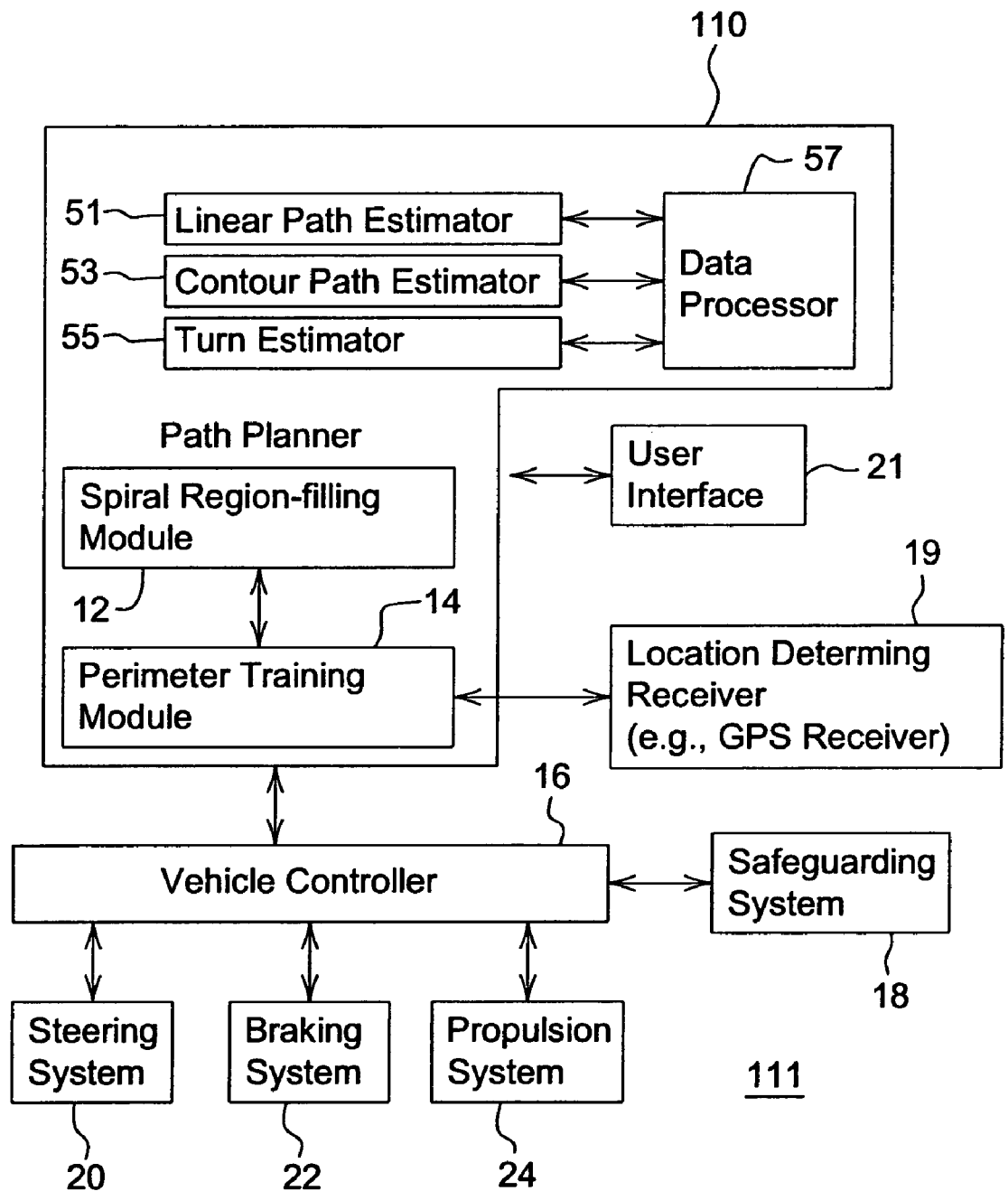
FIG. 22 is a block diagram of an alternate embodiment of a path planner for planning a path of a vehicle incorporated into a vehicle electronics.

The path planning system of FIG. 22 is similar to the path planning system of FIG. 1, except that path planning system of FIG. 22 further includes a linear path estimator 51, a spiral path estimator 53, a turn estimator 55, and a data processor 57 for supporting the determination of whether to use a linear path plan or a path plan with a spiral component (e.g., a spiral path plan) to service a defined work area. The linear path estimator 51 estimates a linear length (or linear time duration) for covering a work area with a linear coverage path. In contrast, the spiral path estimator 53 estimates a spiral length (or spiral time duration) for covering a work area with a spiral coverage path. The turn estimator 55 estimates the length (or duration) of turns for end rows to cover the work area for the linear coverage path and the spiral coverage path. The data processor 57 adds the length of turns for the linear coverage pattern to the linear length to obtain a first total length and the length of turns for the spiral coverage pattern to the spiral length to obtain the second total length. The data processor 57 determines the shorter of the first total length or the second total length to assign a corresponding preferential path plan as the linear path plan or the spiral path plan. In an alternate embodiment, the data processor 57 determines the lesser of the first total time associated with the linear coverage path and the second total time associated with the spiral coverage path, where first total time comprises the linear time duration plus the appropriate turn time duration and the second total time comprises the spiral time duration plus the appropriate turn time duration. The data processor 57 may apply or recommend (e.g., via the user interface 21) a spiral path plan, a linear path plan, or both to cover a particular work area. The work area may be defined by the perimeter training module 14.

Figure 23:
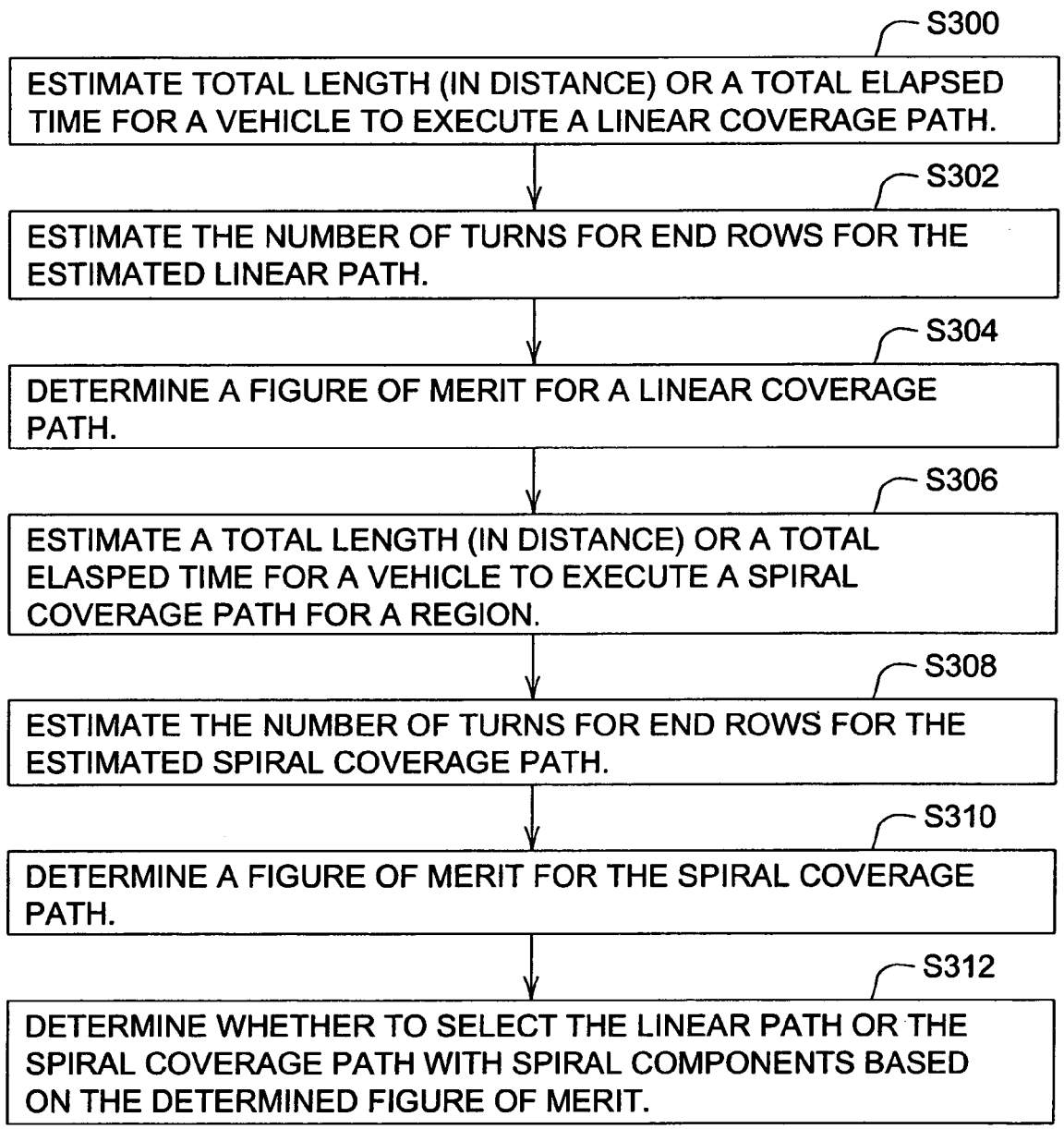
FIG. 23 is a flow chart of a method for determining whether to use a linear path plan or a path plan having a spiral component.

FIG. 23 is a method for determining whether to use a linear path plan or a spiral path plan. The method of FIG. 23 begins with step S300.

In step S300, a linear path estimator 51 estimates a linear path estimate of at least one of a total length (in distance), a total elapsed time, and a total energy consumption for a vehicle to execute a linear coverage path that covers the region (e.g., work area). For example, the path estimator 51 estimates the total length or total elapsed time for the vehicle to traverse the linear path segments that cover the region (e.g., work area). For a linear coverage pattern, back and forth sweeps produce generally parallel straight lines that covers the work area. The estimator considers vehicular constrains such as turning radius, maximum speed, energy consumption, and the like.

In step S302, the turn estimator 55 estimates a first turn estimate of at least one of a total length, a total time, and a total energy consumption associated with the turns at the end of rows, turns for avoiding obstacles, or both of the generally linear path plan. For example, the turn estimator 55 estimates the elapsed time for the vehicle to complete all of the turns (e.g., end of row turns) that support the linear coverage path of step S300. Under one procedure for carrying out step S302, a turn estimator estimates the number of turns (e.g., end row turns) required to support the linear coverage path plan and then converts the number of turns into a total turn length, a total turn time, and a total turn energy consumption.

In step S304, a data processor 57 determines a first figure of merit for a corresponding linear coverage path that covers the work area. The first figure of merit may be determined by adding the linear estimate to the corresponding first turn estimate. In one example, the first figure of merit comprises a total estimated energy consumption for a particular vehicle to complete a corresponding particular linear coverage path, which includes traversing the linear segments of step S300 and the turns of step S302. In another example, the first figure of merit comprises a total estimated time duration for a particular vehicle to complete a corresponding particular linear coverage path, which includes traversing the linear segments of step S300 and the turns of step S302. In another example, the first figure of merit comprises a total estimated length for a particular vehicle to complete a corresponding particular linear coverage path, which includes traversing the linear segments of step S300 and the turns of step S302.

In step S306, a spiral path estimator 53 estimates a spiral path estimate of at least one of a total length (in distance), a total elapsed time, and a total energy consumption for a vehicle to execute a spiral coverage path for a region. For example, the spiral path estimator 53 estimates the total length or total elapsed time for the vehicle to traverse the contour or spiral path segments that cover the region. For a curved coverage region, contour sweeps cover a region with adjacent curved paths. Such paths resemble the patterns of contour lines found on a map of a hill slope. The estimator 53 considers vehicular constrains such as turning radius, maximum speed, energy consumption, and the like.

In step S308, the turn estimator 55 estimates a second turn estimate of at least one of length, time duration and energy consumption associated with one or more of the following turns: the requisite number of turns for ends of rows (if required), the requisite number of turns for linking between nested loops (if required), turns for the requisite number of awaiting one or more obstacles (if required), the requisite number of flip turns (if required) and the requisite number other turns for the estimated spiral path of step S306. For example, the turn estimator 55 estimates the elapsed time for the vehicle to complete the turns (if any) that support the spiral coverage path of step S306. Under one procedure for carrying out step S308, a turn estimator estimates the number of turns (e.g., end row turns) required to support the spiral coverage path plan and then converts the number of turns into a total turn length, a total turn time, and a total turn energy consumption.

In step S310, a data processor 57 determines a second figure of merit for a corresponding spiral coverage path. The second figure of merit may be determined by adding the spiral path estimate to the corresponding second turn estimate. In one example, the second figure of merit comprises a total estimated energy consumption for a particular vehicle to complete a corresponding particular spiral coverage path, which includes traversing the spiral segments of step S306 and the turns of step S308. In another example, the second figure of merit comprises a total estimated time duration for a particular vehicle to complete a corresponding particular spiral coverage path, which includes traversing the linear segments of step S306 and the turns of step S308. In yet another example, the second figure of merit comprises a total estimated energy consumption of the vehicle to complete a corresponding particular spiral coverage path, which includes traversing the linear segments of step S306 and the turns of step S308.

In step S312, the data processor 57 determines whether to select the linear path or the spiral coverage path based on the determined first figure of merit in step S304 and the second figure of merit of step S310. If the second figure of merit is superior to the first figure of merit, then the data processor 57 may select the spiral coverage path as the preferential coverage path. For example, the data processor 57 may select a preferential path with the shortest length, shortest time or the lowest energy consumption based on the determined first figure of merit in step S304 and second figure of merit of step S310. The preferential path may be the spiral path plan, but need not be.

Under certain circumstances, the spiral coverage path for area coverage has efficiency or energy consumption advantages over simple parallel straight lines or a linear coverage path. For example, when the contours of the spiral run adjacent to a long side of the region to be covered, the spiral coverage pattern tends to minimize the number of required linking turns, turns between rows, or flip turns, which reduces the time needed to complete the operation. Additionally, by maximizing the length of the rows, missed areas are minimized and overlapping between rows can be minimized. The first figure of merit and the second figure of merit are intended to capture the efficiency or energy consumption advantages noted above and to support analysis thereof.

Although it is preferable that the reference contour is chosen such that the energy consumption for completion of the resultant coverage path will be minimized in accordance with the method of FIG. 23 or another technique, the user may select a contour reference path for other reasons independent of FIG. 23 or any comparison to corresponding linear paths for a region.

The path plan and method having a spiral component supports spiral sweeps for covering an area to enhance the efficiency of the vehicle operator's work tasks. In accordance with the path plan with the spiral component, the vehicle may start on the border of a shape and work its way inward until the work area has been covered, or vice versa. Spiral coverage paths are used to minimize the number of end-of-row turns that might otherwise occur for a coverage pattern with linear rows. The reduction or minimizing the number of end-of-row turns (over those required for a coverage pattern with generally linear rows) increases the efficiency of the vehicle and the overhead (e.g., reduction of operating hours, fuel consumption, and labor costs) of an operation. The vehicle and operator spends a greater portion of its total time working in the work area to be covered, instead of turning around for the next row.

The starting point and end point of any spiral path plan may be opposite or transposed for the path planning phase versus the path execution phase in any embodiment disclosed herein. For example, any path planning method disclosed herein may work inward from a reference contour (e.g., outer boundary of the work area) to complete the path plan. However, the inwardly-formed spiral path plan may be subsequently executed by a vehicle in the reverse order, from inward to outward.

Having described the preferred embodiment, it will become apparent that various modifications can be made without departing from the scope of the invention as defined in the accompanying claims.

What is claimed is:

1. A method for planning a path of a vehicle, the method comprising:

identifying a border of a region associated with a work area;

defining a reference row having a reference path that tracks at least a majority of the border;

generating tracking rows that track the reference row, the tracking rows comprising at least one inner tracking row and an outer tracking row, each inner tracking row having at least one inner curve with a lesser radius than an outer curve of an outer tracking row to form a path plan having a spiral component; and detecting a pinch region associated with the path plan, the pinch region referring to a narrow region or bottleneck of the work area in which a spiral path is constrained or prevented from realization.

2. The method according to claim 1 wherein the border comprises an outer border and wherein the generating of tracking rows tracks inward from the reference row.

3. The method according to claim 1 wherein the border comprises an inner border about an obstacle in the work area and wherein the generating of tracking rows tracks outward from the reference row.

4. The method according to claim 1 wherein the identifying of the border of the region is associated with at least one of a generally circular portion and a generally semi-circular portion, and wherein the generating comprises generating tracking rows to form a set of arcs inward from at least one of the generally circular portion and generally semi-circular portion.

5. The method according to claim 4 wherein the radius of each arc is defined in accordance with the following equation:

Arc radius=a×theta, where a is the initial radius or outer radius and wherein theta is a variable that reduces the initial radius as a function of angular displacement along a path and inward toward a central area of the region.

6. The method according to claim 1 wherein the border is generally circular and wherein the tracking rows form a spiral with a varying radius that decreases toward an interior or center of the region.

7. The method according to claim 1 wherein the identifying of the border comprises identifying a corner associated with the region; and further comprising:
establishing an additional path extending diagonally between the identified corner and a central area of the region.

8. The method according to claim 1 wherein the identifying of the border comprises identifying a corner associated with the region; and further comprising:
establishing a virtual boundary extending diagonally from the corner to an interior region of the region; and
planning one or more flip turns associated between tracking rows along the virtual boundary.

9. The method according to claim 1 further comprising:
detecting the pinch region in a tracking row associated with a loop in a path plan; and
defining one or more cross-over rows at the pinch region over which the vehicle may travel multiple times to service areas on each side of the pinch region in accordance with a path plan having a spiral component.

10. The method according to claim 1 further comprising:
detecting the pinch region in a tracking row associated with a loop in a path plan; and
defining a first coverage area on a first side of the pinch region and a second coverage area on a second side of the pinch region.

11. The method according to claim 10 further comprising:
applying a first spiral path plan to the first side and a second spiral path plan to a second side.

12. The method according to claim 1 wherein the generating comprises:
forming a series of nested loops spaced apart from one another by a generally uniform spacing, at least one of the nested loops tracking the reference row; and
linking one nested loop to another nested loop to interconnect the nested loops for the path plan having a spiral component.

13. The method according to claim 12 wherein the linking is accomplished by moving transversely inward to the nested loops toward a central area of the region.

14. The method according to claim 12 wherein the linking is accomplished by moving transversely outward to the nested loops away from a central area of the region.

15. The method according to claim 12 further comprising:
identifying a corner associated with the region of the work area; and wherein the linking of nested loops is accomplished by the vehicle's traverse movement along a diagonal formed between the central area and the identified corner.

16. The method according to claim 1 further comprising:
identifying the presence of one or more obstacle areas in the region; and
defining flip turns in the tracking rows associated with a zone boundary of one or more obstacle clearance zones to interconnect different tracking rows, while maintaining a desired clearance from a corresponding obstacle.

17. The method according to claim 1 further comprising:
determining a first figure of merit for a generally linear coverage path for the region, the first figure of merit being based on at least one of total length, elapsed total time, and a total energy consumption of a vehicle to execute the generally linear coverage path;
determining a second figure of merit for a generally spiral coverage path for the region, the second figure of merit being based on at least one of total length, elapsed total time, and a total energy consumption of a vehicle to execute the generally spiral coverage path; and
determining whether to select the generally linear coverage path or the spiral coverage path based on the first figure of merit and the second figure of merit, the selection based on at least one of the shortest total length, the shortest elapsed total time, and the lowest total energy consumption.

18. A path planner for planning a path of a vehicle comprising:
a perimeter training module for identifying a border of a region associated with a work area;
a definer for defining a reference row having a reference path that tracks at least a majority of the border;
a generator for generating tracking rows that tracks the reference row, the tracking rows comprising at least one inner tracking row and an outer tracking row, each inner tracking row having at least one inner curve with a lesser radius than an outer tracking row having a corresponding outer curve with a greater radius; and
a detector for detecting a pinch region associated with the path plan, the pinch region referring to a narrow region or bottleneck of the work area in which a spiral path is constrained or prevented from realization.

19. The path planner according to claim 18 wherein the border comprises an outer border and wherein the generating of tracking rows tracks inward from the reference row.

20. The path planner according to claim 18 wherein the border comprises an inner border about an obstacle in the work area and wherein the generating of tracking rows tracks outward from the reference row.

21. The path planner according to claim 18 wherein a data processor detects the presence of at least one of a generally circular portion and a generally semi-circular portion of the border, and wherein the generator comprises generating tracking rows to form a set of arcs inward from at least one of the generally circular portion and generally semi-circular portion.

22. The path planner according to claim 21 wherein the radius of each arc is defined in accordance with the following equation:
Arc radius=a×theta, where a is the initial radius or outer radius and wherein theta is a variable that reduces the initial radius as a function of angular displacement along a path and inward toward a central area of the region.

23. The path planner according to claim 18 wherein the border is generally circular and wherein the tracking rows form a spiral with a varying radius that decreases toward an interior or center of the region.

24. The path planner according to claim 18 wherein a data processor supports identification of a corner of the border associated with the region; and wherein the generator establishes an additional path extending diagonally between the identified corner and a central area of the region.

25. The path planner according to claim 18 wherein a data processor supports the identification of a corner of the border associated with the region; and wherein the generator establishes a virtual boundary extending diagonally from the corner to an interior region of the region, an interconnection module planning one or more flip turns between tracking rows along the virtual boundary.

26. The path planner according to claim 18 further comprises:

an interconnection module defining one or more crossover rows at the pinch region over which the vehicle may travel multiple times to service areas on each side of the pinch region in accordance with a path plan having a spiral component.

27. The path planner according to claim 18 further comprises:

a definer for defining a first coverage area on a first side of the pinch region and a second coverage area on a second side of the pinch region.

28. The path planner according to claim 18 further comprising:

a data processor for applying a first spiral path plan to the first side and a second spiral path plan to a second side.

29. The path planner according to claim 18 wherein:

a generator is arranged to form a series of nested loops spaced apart from one another by a generally uniform spacing, at least one of the nested loops tracking the reference row;

an interconnection module for linking one nested loop to another nested loop to interconnect the nested loops.

30. The path planner according to claim 18 further comprising:

a safeguarding system for identifying the presence of one or more obstacle. areas in the region; and a spiral region filling module for defining turns in the tracking rows associated with a zone boundary of one or more obstacle clearance zones to interconnect different tracking rows.

31. The path planner according to claim 18 further comprising:

a linear path estimator and a turn estimator for determining a first figure of merit for a generally linear coverage path for the region, the first figure of merit being based on at least one of total length, elapsed total time, and a total energy consumption of a vehicle to execute the generally linear coverage path;

a spiral path estimator and the turn estimator for determining a second figure of merit for a generally spiral coverage path for the region, the second figure of merit being based on at least one of total length, elapsed total time, and a total energy consumption of a vehicle to execute the generally spiral coverage path; and a data processor for determining whether to select the generally linear coverage path or the spiral coverage path based on the first figure of merit and the second figure of merit, the selection based on at least one of the shortest total length, the shortest elapsed total time, and the lowest total energy consumption.

* * * * *